(12) United States Patent
Braedt et al.

(10) Patent No.: US 12,728,950 B2
(45) Date of Patent: Sep. 8, 2026

(54) ELECTRIC BICYCLE DRIVE UNIT AND ENERGY STORAGE DEVICE

(71) Applicant: SRAM DEUTSCHLAND GmbH, Schweinfurt (DE)

(72) Inventors: Henrik Braedt, Dittelbrunn (DE); Sebastian Heyna, Dittelbrunn (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 363 days.

(21) Appl. No.: 18/479,964

(22) Filed: Oct. 3, 2023

(65) Prior Publication Data

US 2024/0132179 A1 Apr. 25, 2024
US 2024/0227980 A9 Jul. 11, 2024

(30) Foreign Application Priority Data

Oct. 20, 2022 (DE) ..................... 10 2022 127 802.6

(51) Int. Cl.
*B62M 6/55* (2010.01)
*B62J 43/13* (2020.01)
*B62J 43/28* (2020.01)

(52) U.S. Cl.
CPC ................ *B62M 6/55* (2013.01); *B62J 43/13* (2020.02); *B62J 43/28* (2020.02)

(58) Field of Classification Search
CPC ............. B62M 6/55; B62J 43/28; B62J 43/13
See application file for complete search history.

(56) References Cited

U.S. PATENT DOCUMENTS

| | | | | |
|---|---|---|---|---|
| 10,137,954 | B2 * | 11/2018 | Hendey | B62M 6/90 |
| 10,906,610 | B2 * | 2/2021 | Talavasek | B62J 43/13 |
| 11,046,389 | B2 * | 6/2021 | Talavasek | B62M 6/50 |
| 11,345,437 | B2 * | 5/2022 | Talavasek | H01M 50/249 |
| 11,639,211 | B2 * | 5/2023 | Farrell | B62K 3/08 180/68.5 |
| 11,807,338 | B2 * | 11/2023 | Kameda | B60L 50/64 |
| 2020/0062341 | A1 | 2/2020 | Talavasek | |
| 2020/0247502 | A1 | 8/2020 | Mitsuyasu | |
| 2021/0147032 | A1 | 5/2021 | Farrell | |
| 2022/0033032 | A1 | 2/2022 | Sendo | |
| 2022/0332389 | A1 * | 10/2022 | Braedt | B62J 43/28 |

FOREIGN PATENT DOCUMENTS

| | | |
|---|---|---|
| CN | 215399137 U | 1/2022 |
| DE | 102022109481 | 10/2022 |

* cited by examiner

*Primary Examiner* — Valentin Neacsu
*Assistant Examiner* — Michael R Stabley

(57) ABSTRACT

An electric bicycle drive unit is arranged in a bottom bracket area of a bicycle frame. The drive unit includes a bottom bracket assembly having a bottom bracket shaft, an electric motor device and an energy storage device for supplying energy to the motor device. The energy storage device can be arranged in a down tube of the bicycle frame having a closed tube cross-section, and is removable from the down tube coaxially along a longitudinal axis of the down tube. The disclosure also relates to a bicycle frame or frame interface unit respectively, and to an energy storage device for the electric bicycle drive unit. The energy storage device is attached directly to a housing of the motor device or in a common housing of motor device and energy storage device when the drive unit is installed in the bicycle frame in a state ready for operation.

18 Claims, 16 Drawing Sheets

ELECTRIC BICYCLE DRIVE UNIT AND ENERGY STORAGE DEVICE

PRIORITY

This application claims priority to, and/or the benefit of, German patent application DE 10 2022 127 802.6, filed on Oct. 20, 2022, the contents of which are included by reference herein in their entirety.

BACKGROUND

All-terrain bicycles with an electric assistance drive are enjoying increasing popularity. These bicycles which are also called E-mountain bikes or, for short, E-MTBs are split into, and/or used for sporting purposes in, categories such as, for example, “cross-country”, “trail”, “enduro” and “downhill”.

High requirements for robustness, frame rigidities and “handling” of the E-MTB occur in the case of uses of this type. In the case of handling of the E-MTB, the position of the center of gravity of the bicycle is of importance, above all. A high center of gravity of the bicycle impairs cornering and increases the risk of somersaulting in the case of pronounced break retardation or in steep downhill passages.

The distance between the center of gravity of the bicycle and the rear wheel axle is also of particular importance. The further forward the center of gravity of the bicycle is situated in the direction of travel, the higher the risk of somersaults, and the more difficult it becomes for the rider to raise the front wheel, in particular in cases without assistance of a drive torque.

The raising of the front wheel is one of the most important riding techniques which is applied in a very wide variety of riding situations. In this way, relatively great obstacles and steps can be overcome, or bumps can be ridden over at high speed. In comparison with bicycles or mountain bikes without assistance drive, the weight of the rechargeable batteries and the motor, above all, are of significance in this regard.

Furthermore, in the case of E-mountain bikes, the distance between the rear wheel axle and the bottom bracket shaft is generally speaking increased in comparison with a mountain bike without an additional drive, since the electric motor also takes up installation space in the region of the bottom bracket shaft, and since less radial clearance for the rear wheel tire is therefore available there. In the case of fully suspended bicycles, the installation space for the yoke which is usually required for reasons of stability between the chain stays in the region of the bottom bracket is also impaired by way of the electric additional drive. A conflict in terms of installation space with corresponding rotary joints of the rear wheel suspension system can also arise depending on the rear frame kinematics used for the rear wheel suspension system.

Moreover, the frame rigidities and the frame weight in the case of E-MTBs are usually compromised by open lower tube constructions which are usually required for receiving the drive battery in the case of known E-MTBs. In particular, the torsional loading by way of pedal loads or else the input of torque via the handlebar set can be absorbed in a substantially improved manner via a lower tube with an intact tube cross section, since, in the case of a closed tube cross section, the section modulus countering torsion is substantially higher than in the case of a U-shaped profile cross section of this type.

As a consequence, a closed tube cross section also has an improved quotient of rigidities and weight than the known open profile cross sections. Furthermore, connecting elements for receiving and fastening drive batteries in or to the lower tube increase the complexity and the weight of the bicycle, just like current and signal cables which run between the battery and the drive.

Furthermore, the center of gravity of the bicycle is moved far towards the front to the disadvantage of the handling as a result of the customarily considerable distance of drive batteries of this type from the rear wheel axle.

SUMMARY

According to one aspect, an electric bicycle drive unit for arrangement in a bottom bracket area of a bicycle frame includes: a bottom bracket assembly with a bottom bracket shaft, an electric motor device with a motor shaft which is arranged coaxially or axially parallel with respect to the bottom bracket shaft, an energy storage device for supplying energy to the motor device, wherein the energy storage device, in a state of the drive unit installed in the bicycle frame and ready for operation, can be arranged at least to a substantial extent in a down tube of the bicycle frame, the down tube having a closed tube cross section, and wherein the energy storage device is configured to be removable from the bicycle frame in a removal direction extending coaxially with respect to a longitudinal axis of the down tube, wherein, in the state of the drive unit in which it is installed into the bicycle frame ready for operation, the energy storage device is fastened directly to a housing of the motor device or in a common housing of the motor device and the energy storage device.

BRIEF DESCRIPTION OF DRAWINGS

Other aspects and advantages of the embodiments disclosed herein will become apparent upon consideration of the following detailed description, wherein similar or identical structures have similar reference numerals.

DETAILED DESCRIPTION

Figure 1:
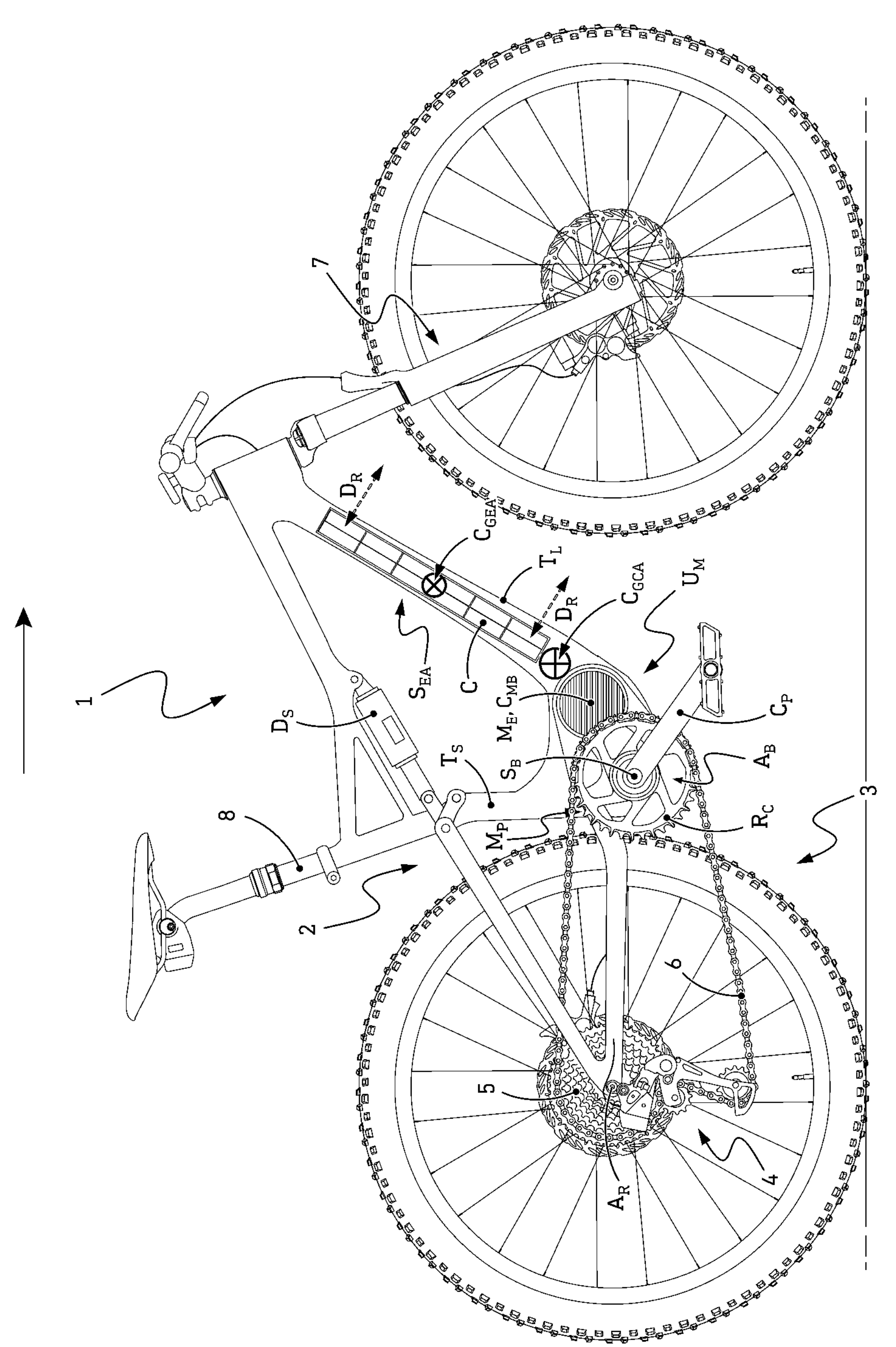
FIG. 1 shows an E-mountain bike according to the prior art in a drive-side side view.

The present disclosure relates to an electric bicycle drive unit, to a bicycle frame or a frame interface unit, and to an energy storage device.

Location and direction information used in the following description and not substantiated in further detail such as "left", "right", "front", "rear", "top", "bottom", "side view", etc. corresponds to a rider perspective on a bicycle.

The disclosure of the German patent application with the DPMA file reference 10 2022 109 481.2 is included by reference in the disclosure of the present patent application.

Proceeding from the above-described prior art, it is the object of the present disclosure to provide a solution for arranging or integrating the energy store and the drive unit for an E-mountain bike, by way of which the above-described disadvantages can be overcome.

The terms "energy storage device" and "battery" are used synonymously with respect to one another in the following text.

If, in the following text, a "bicycle frame" or a "frame interface unit" is mentioned in conjunction with the fastening of an electric bicycle drive unit to a bicycle frame or to a frame interface unit, a bicycle frame or a frame interface unit is in each case meant as an alternative, even if the two terms should not always be mentioned.

As can be gathered from the following description at various locations, the electric bicycle drive unit according to the present disclosure can be installed, for example, either directly into a bicycle frame which is provided with corresponding interfaces, or the electric bicycle drive unit can be installed into a frame interface unit which is provided with corresponding interfaces and in turn is or can be part of a bicycle frame.

In accordance with the generic type, the drive unit includes an electric motor device and a bottom bracket assembly with a bottom bracket shaft for receiving the pedal cranks of the bicycle. In a manner which forms the generic prior art, the motor shaft is arranged coaxially or axially parallel with respect to the bottom bracket shaft. Furthermore, the drive unit includes an energy storage device for supplying energy to the motor device.

The energy storage device is capable of being arranged, in a state of the drive unit in which it is installed into the bicycle frame ready for operation, at least to a substantial part of the energy storage device in a lower tube of the bicycle frame. "To a substantial part" is intended to mean within the context of the present disclosure that the energy storage device can be arranged in the lower tube at least up to a third of its length dimension which runs along the longitudinal axis of the lower tube in the inserted state.

As described at the outset, the lower tube has a closed tube cross section in the sense of a high flexural and torsional rigidity. Accordingly, the energy storage device is configured for removal from the bicycle frame in a removal direction which runs coaxially with respect to a longitudinal axis of the lower tube; this is therefore an energy storage device which is known as a so-called slide-in battery among experts.

Depending on the embodiment of the motor, a drive unit of the generic type usually also includes a step-down transmission which is customarily arranged together with the motor in a common motor housing for the transmission of the assisting motor torque to the bottom bracket shaft. Transmission-less drive units are also known for the direct drive of the bottom bracket shaft, however, to which drive units the present disclosure likewise extends.

The drive unit is distinguished by the fact that, in the state of the drive unit in which it is installed into the bicycle frame ready for operation, the energy storage device is fastened directly to a housing of the motor device or in a common housing of the motor device and the energy storage device.

In the context of the present disclosure, "fastened directly" is intended to mean that the energy storage device is fastened directly and, in particular, without intermediate elements which are to be assigned to the bicycle frame such as, for example, frame tubes, tube lugs and the like to a housing of the motor device or in a common housing of the motor device and the energy storage device.

In the first instance, this means that the energy storage device is spatially consolidated with the motor device and with the bottom bracket assembly, and possibly together with the step-down transmission between the motor device and the bottom bracket shaft, and is configured as a drive unit which is integrated in this way and, after mounting of the drive unit, is positioned as a unit which is likewise integrated in the bottom bracket region of the bicycle.

On account of the direct connection between the energy storage device and the motor device, the drive unit including the energy storage device can be handled as a substantially single-piece unit, even before it is installed into a bicycle frame.

In addition, the direct fastening or connection between the energy storage device and the motor device makes it possible that all the required current and data connections between the energy storage device and the motor device can be laid on the shortest path within the drive unit, in particular without, for instance, exposed or cantilevered cable or plug connections being required for this purpose, as are customary to a large extent in the entire prior art.

Within the context of the present disclosure, "bottom bracket region" means the direct spatial surroundings of the bicycle bottom bracket, including the direct end regions of the saddle and lower tubes which adjoin the bottom bracket, as distinct, in particular, from the spatial region of the entire bicycle lower tube as far as the bicycle steering head, which, in the prior art, usually contains the energy storage device for the electric motor device.

Within the context of the present disclosure, the direct fastening of the energy storage device to a housing of the motor device or in a common housing of the motor device and the energy storage device means that the energy storage device is either arranged together with the motor device of the drive unit in a common housing, or is fastened or can be fastened to a housing of the motor device directly adjacently with respect to this housing.

In contrast to the prior art described at the outset, the energy storage device in accordance with the present disclosure is positioned in the immediate vicinity of the drive unit and therefore substantially also at the horizontal level of the bottom bracket assembly. This results in a vertically extremely low position of the center of gravity of the integrated drive unit, which positioning is limited merely as a result of ensuring the respective desired ground clearance in the region of the bottom bracket.

Furthermore, the distance of the center of gravity of the drive unit or of the entire bicycle from the rear wheel axle is also advantageously reduced in this way.

Since the widest region is usually the bottom bracket receptacle in the case of a bicycle frame, apart from the rear frame, the installation space which is available in the axial direction (in relation to the bottom bracket shaft) can be utilized in a considerably improved manner in this region by way of the drive unit in accordance with the present disclosure, than is customary in the prior art.

In other words, this means that, in particular, the cross-sectional dimensions of the energy storage device (in relation to a sectional plane parallel to the axis of the bottom bracket shaft) can be considerably greater than in the case of conventional energy stores which are arranged in the region of the lower tube or completely in the lower tube.

In particular, unlike in the prior art with the lower tube which has a cross section which is usually open for battery removal and is frequently U-shaped, the bicycle frame can be realised with an intact, that is to say closed lower tube cross section, as a result of which the flexural and torsional rigidities of the lower tube and therefore of the bicycle frame are increased decisively, and the mass of the bicycle frame can be reduced correspondingly.

As a result of the integration of the motor device and the energy storage device and the fastening of the energy storage device to the motor device, furthermore, the cables and complicated plug devices which are otherwise necessary for the electric connection of these assemblies can be reduced or eliminated, which leads to further cost and weight savings.

Last but not least, the structural design of the bicycle frame, such as the mounting of the drive unit on the bicycle frame, is also simplified decisively by virtue of the fact that the drive unit including the energy storage device and including all the current and data connections between the energy storage device and the motor device can be handled and mounted as a substantially single-piece unit.

It is provided in accordance with one preferred embodiment that, in the state of the drive unit in which it is installed into the bicycle frame ready for operation, the energy storage device is directly fastened exclusively to a housing of the motor device or in a common housing of the motor device and the energy storage device.

This means that, not only in a state in which the drive unit is separate from the bicycle frame and is not yet mounted on the bicycle frame, but rather also in the state in which it is installed into the bicycle frame ready for operation, the energy storage device has a direct fastening exclusively to a housing of the motor device or on a common housing of the motor device and the energy storage device, and accordingly is not connected directly to the bicycle frame.

This embodiment also entails reproducibly and durably secure fixing of the energy storage device, since this fixing of the energy storage device is not reliant on latching or guide elements which are merely or directly arranged on or in and fastened to or in the bicycle frame.

Furthermore, the handling or the removal and the reinsertion of the energy storage device is/are facilitated and the reliability of these handling operations is increased.

This design also reduces the complexity in the construction and production of the bicycle frame, since the complicated additional fastening devices which are customary in the prior art for the battery to the bicycle frame are dispensed with. In this way, the manufacturer of the bicycle frame is given greater design freedom with at the same time reduced tolerance requirements in these regions of the bicycle frame with regard to the receiving of the energy storage device into the bicycle frame.

In accordance with a further preferred embodiment, the energy storage device is enclosed or can be enclosed at least partially by a housing of the motor device or by a common housing of the motor device and the energy storage device. Here, the housing does not have to be a housing which is closed in all regions, in particular not in those regions of the housing which are provided for enclosing and/or receiving the energy storage device. Rather, at least the latter housing regions can also be configured such that they enclose the energy storage device only in regions substantially in the manner of a skeleton. Weight is saved in this way, and the accessibility of the energy storage device is improved, in particular for the purpose of changing and/or charging the battery.

Furthermore, the energy storage device together with the motor device can also be arranged or can be capable of being arranged in a common housing in the form of a fully integrated design. In the case of this embodiment, mass and costs can be saved by way of connecting elements and separate housing elements not being required. Any required exchange of the energy storage device preferably takes place in the case of this embodiment by qualified staff after corresponding opening of the common housing of the motor device and the energy storage device.

In accordance with one preferred embodiment, in a state of the drive unit in which it is installed into the bicycle frame ready for operation, the energy storage device can be arranged or is arranged to a substantial part outside a lower tube of the bicycle frame. Within the context of the present disclosure, “to a substantial part” is intended to mean that, in the state of the drive unit in which it is installed into the bicycle, preferably at least a part of the energy storage device which corresponds to a quarter of the mass of the energy storage device is arranged outside the lower tube. In a position of the drive unit which corresponds to the state in which it is installed into the bicycle frame ready for operation, the energy storage device is likewise preferably situated at least partially below the rotatory axis of the bottom bracket shaft.

This design complies with the desired low center of gravity of the bicycle, and facilitates both the structural integration of the drive unit into the bicycle frame and the handling of the energy storage device during the removal and during the reinsertion.

With regard to the desired position of the center of gravity as low as possible, it is preferably provided that the mass center of gravity of the drive unit, that is to say a common mass center of gravity of the motor device possibly with the transmission, the bottom bracket assembly and the energy storage device, lies within the bottom bracket region defined in the introduction to the description.

Here, the mass center of gravity of the drive unit is situated, in a bicycle side view and in a position of the drive unit which corresponds to the mounted state of the drive unit on the bicycle frame, within a circumcircle with the radius 175 mm, preferably within a circumcircle with the radius 125 mm, and particularly preferably within a circumcircle with the radius 100 mm around the rotatory axis of the bottom bracket shaft.

In this way, a low mass center of gravity of the bicycle is achieved which, as described at the outset, it is advantageous for the riding behaviour. At the same time it can also thus be ensured that the mass center of gravity of the bicycle is moved rearwards as far as possible in relation to the direction of travel, which likewise aids the riding behaviour and handling of the bicycle.

In accordance with one preferred embodiment of the drive unit, the mass center of gravity of the drive unit is situated, in a side view from the right and in relation to the rotatory axis of the bottom bracket shaft, within a bottom bracket quadrant lying at the top right with the side length 175 mm, preferably within a corresponding bottom bracket quadrant with the side length 125 mm, and particularly preferably within a bottom bracket quadrant with the side length 100 mm.

The mass center of gravity of the drive unit is likewise preferably situated, in relation to the rotatory axis of the bottom bracket shaft, at a height of 50 mm, preferably of 30 mm, particularly preferably of 20 mm above the rotatory axis of the bottom bracket shaft.

The disadvantages shown in detail in the introduction to the description of known E-mountain bikes, in particular with regard to handling and riding safety, can be significantly improved by way of this position of the center of gravity of the drive unit.

A further preferred embodiment of the drive unit includes a drive shield which is fastened exclusively to the housing of the motor device or to the common housing of the drive unit, the drive shield hatch at the same time forming a movable latch hatch for covering and/or securing the energy storage device.

This is advantageous, in particular since the considerable forces which can occur, for example, if a bicycle comes into contact with an obstacle in the bottom bracket region can in this way be introduced directly from the drive shield hatch into the drive unit, and from the latter possibly into the bicycle frame.

In addition, the bicycle frame is further relieved significantly in the frequent cases, in which the rider stands on the pedals when the bicycle comes into contact with an obstacle in the bottom bracket region. Thanks to the fastening of the drive shield hatch exclusively to the drive unit (and not, for instance, to the bicycle frame), the impact forces can be introduced directly into the bottom bracket shaft of the drive unit and from there into the damping and absorbing legs of the rider, without loading the frame significantly.

In the prior art, in contrast, drive shields are usually not connected to the drive housing, but rather directly to the bicycle frame. For this reason, there is a considerable risk in the prior art of overloading and therefore damaging the bicycle frame, for example when coming into contact with obstacles.

In accordance with one particularly preferred embodiment, the drive unit includes precisely two frame interface arrangements, namely a front and a rear frame interface arrangement. Here, the two frame interface arrangements of the drive unit define an (imaginary) rear fixation axis and a front support axis arrangement with a front (imaginary) fixation axis.

The front support axis arrangement can include one or more fixation axes. If the front support axis arrangement includes a plurality of fixation axes, their common centroidal axis defines the position of the (imaginary in this case) front fixation axis.

In the following text, some particularly preferred positions of the interfaces between the drive unit and the bicycle frame will be specified, in particular the preferred locations and positions of frame interface arrangements and drive unit interface arrangements, and of fixation axes between the drive unit and the bicycle frame.

The frame interfaces of the drive unit and therefore the front and rear fixation axes preferably lie as interfaces between the drive unit and the bicycle frame in a vertical region above an imaginary horizontal plane which contains the rotatory axis of the bottom bracket shaft, and below a horizontal plane which contains the attack point of the chain traction force on the chainring.

In order to minimise torques, generated by way of the chain traction force which can readily reach an order of magnitude of 5000 N, and corresponding loads or deformations of the drive unit or the bicycle frame, the vertical distance between the rear fixation axis and the attack point of the change traction force is as small as possible, preferably less than 30 mm, particularly preferably less than 20 mm.

In the state of the drive unit in which it is installed into the bicycle frame ready for operation, the two fixation axes are arranged further forwards than an imaginary vertical plane which contains the rotatory axis of the bottom bracket shaft, particularly preferably more than 20 mm further forwards than the imaginary vertical plane. As a result, installation space which is valuable for the bicycle manufacturer is provided in the region directly behind the bottom bracket shaft, which region is of significance for the rear wheel kinematics of suspended bicycles and for the chain stay link which is desirably as small as possible.

Here, the two fixation axes are preferably arranged in front of an imaginary inclined plane which contains the rotatory axis of the bottom bracket shaft, the inclined plane being tilted forwards by an angle $\beta$ of 50° relative to a horizontal plane which contains the rotatory axis of the bottom bracket shaft, in other words tilted in the clockwise direction, in relation to a view of a bicycle from the right.

As viewed from the right, the two fixation axes are likewise preferably arranged within an angle $\alpha$ of from 30° to 80°, particularly preferably within an angle $\alpha$ of from 50° to 60°, localized in the right-hand upper bottom bracket quadrant, the vertex of the angle $\alpha$ coinciding with the rotatory axis of the bottom bracket shaft.

Positioning of this type of the two fixation axes is possible only as a result of the interaction of a plurality of special features of the drive unit in accordance with the present disclosure, including, in particular, the assignment of virtually all forces, torques and tolerances to the rear interface location and the short tolerance chains and force transmission paths achieved in this way, and a high rigidity of the drive unit which in turn makes it possible to dispense with the third fixation axis, customary in the prior art, far behind and partially even below the bottom bracket shaft.

Numerous advantages can be achieved over the prior art by way of positioning of this type of the two fixation axes as interfaces between the drive unit and the bicycle frame.

First of all, substantially more installation space is available as a result for assemblies of the rear frame suspension system and swing arm bearings and damper articulation, since the bicycle frame no longer has to reach, as in the prior art, comparatively far as far as behind the bottom bracket and partially even as far as below the bottom bracket height, in order to support the electric drive unit there. As a result, the complexity, weight and the costs are also decreased, and the frame manufacturer is given substantially more design freedom in the functionally highly important region directly behind the bottom bracket.

Furthermore, the options for cooling the electric and electronic components of the drive unit by way of the above-described designs are improved in comparison with the prior art, in which the frame often encloses a large part of the drive unit at least in the connecting region to the drive unit. This plays an increasing role in the currently ever decreasing overall sizes of these components with at the same time generally speaking rising motor force outputs.

With regard to the lateral positioning of the frame interfaces on the drive unit, it is preferably provided that interface planes which preferably run parallel to a bicycle longitudinal plane between the rear interface locations of the drive unit and the associated rear drive unit interfaces on the frame side are positioned to the left and to the right in each case on the outboard side outside the bicycle frame with regard to an optimum transmission of torque and force from the drive unit to the bicycle frame, and with regard to a high rigidity of the drive unit, which results in a correspondingly advantageously great support width between the bicycle frame and the housing of the drive unit.

In this context, a support factor can be formed as a quotient from this housing support width of the drive unit and the length of the bottom bracket shaft. In the case of the drive unit in accordance with the present disclosure, the support factor is greater than 0.5, preferably greater than 0.55 and particularly preferably greater than 0.58.

Among experts, what is known as the Q-factor QF is also known as a characterising variable of a bicycle drive train, which Q-factor denotes the distance in millimetres between the outer sides of the two bicycle cranks in the region of the pedal threads. In this regard, it is also desirable in relation to the rigidity of the drive and minimization of the loading both of the drive unit and of the bicycle frame for a value which is as great as possible to be obtained for a quotient from the housing support width of the drive unit and the Q-factor of a drive unit which is completed with bicycle cranks. On account of its large housing support width, the drive unit in accordance with the present disclosure readily achieves values in this regard for a quotient of this type which lie at 0.45 or above.

As an alternative or in addition to the preferred values of the support factor, the support width is selected in such a way that a chain pull factor which is formed as a quotient from the support width and a chain pull horizontal distance between the attack point of the chain traction force on the chainring and the right-hand-side interface plane is greater than 5, preferably greater than 5.2 and particularly preferably greater than 5.3.

In this way, an optimum transmission of the transverse forces which act on the drive unit, in particular the pedal forces, and likewise the chain traction forces, on the shortest path into the bicycle frame is ensured. As a result, those structures of the drive unit and the bicycle frame which are involved in this transmission of force are also given a particularly high rigidity with a low weight, which counteracts undesired deformations and associated force losses during operation of the drive unit.

In contrast, values for the support factor in the case of drive units from the prior art usually lie considerably below 0.4, and values for the chain pull factor usually lie considerably below 3.

The values for the support factor and for the chain pull factor become possible, in particular, by virtue of the fact that the drive unit in accordance with the present disclosure engages from the outside around the bicycle frame in the bottom bracket region, or the frame interface unit which is arranged there. This is usually reversed in the prior art; in other words, the bicycle frame (which is often per se already relatively narrow in the bottom bracket region) engages around the drive unit, at least in the regions of the frame interfaces or fixation axes of the drive unit. As a result, in particular, the support widths in the prior art turn out to be considerably narrower than is achieved in accordance with the present disclosure.

This results in the prior art in high bending moments as a result of the action of the pedal forces and chain pull forces which either lead to correspondingly great deformations of the drive unit and/or the bicycle frame in the bottom bracket region, or which have to be absorbed and compensated for by way of great wall thicknesses in these regions, which leads to correspondingly higher weights of the drive unit and/or frame.

Furthermore, all the degrees of freedom of movement of the drive unit with respect to the bicycle frame or with respect to a frame interface unit are preferably fixed or capable of being fixed via the rear frame interface arrangement, apart from a rotary freedom of movement about a rotatory axis which is parallel to the rotatory axis of the bottom bracket shaft.

Within the context of the present disclosure, this means that all the forces and torques between the drive unit and the bicycle frame or the frame interface unit can be transmitted via the rear frame interface arrangement, with the exception of torques which act about the rotatory axis or fixation axis of the rear frame interface arrangement.

Here, the remaining rotary freedom of movement with respect to the bicycle frame or with respect to the frame interface unit is fixed or capable of being fixed by means of the front frame interface arrangement. Here, this fixing preferably takes place by means of a frictional connection between the front frame interface arrangement of the drive unit and a corresponding front drive unit interface arrangement of the bicycle frame. The frictional connection has the advantage, in particular, of making particularly low requirements of the accuracy and the tolerances of the bicycle frame in the region of the front drive unit interface arrangement, which decreases the costs or manufacturing of the bicycle frame and the complexity during the assembly of the unit.

The rear frame interface arrangement preferably includes a frame offset adapter for compensating for width tolerances of the bicycle frame or the frame interface unit. The frame offset adapter includes a radial clamping device which can be received in an axially displaceable manner in a receiving opening of the drive housing for radial fixing (with regard to the rear fixation axis) of the rear frame interface arrangement relative to the bicycle frame or relative to the frame interface unit and for axial tolerance compensation, which can be adjusted (in relation to the rear fixation axis) in an infinitely variable manner without play, between the rear frame interface arrangement and the bicycle frame or the frame interface unit.

This tolerance compensation is of considerable importance, since the drive unit can in practice on the bicycle market be combined with a very wide variety of vehicle frames or possibly with a very wide variety of frame interface units, it being possible for the bicycle frames or possibly the frame interface units to come from or be supplied by a very wide variety of manufacturers, and additionally to consist of a very wide variety of materials such as, for example, steel, light metal or fibre composite material.

According to experience, depending on the origin or manufacturer of the bicycle frame or the frame interface unit, this results in a very wide variety of tolerance situations in relation to the support width on the bicycle frame or on the frame interface unit. Different tolerance situations of this type can be compensated for simply and, in particular, in an infinitely variable manner by way of the offset adapter in accordance with the present disclosure.

Furthermore, the drive unit preferably includes a hermetically closed controller housing which is arranged in a spatial region between the motor device and the energy storage device for receiving a controller device for controlling the motor device and/or the energy storage device. The controller housing can also be configured in one piece with a part of the motor housing.

The controller housing can have a plug device, known per se in the prior art, for the connection of the control device and the energy storage device. Particularly preferred embodiments of the plug-in device are described further below and are shown in the figures.

The controller housing particularly preferably includes a current interface for the connection of the control device and the energy storage device, in the case of which current interface the interface surfaces, that is to say the contact surface is provided for mutual, current-transmitting contact of the battery-side and controller-type plug, are arranged parallel to the removal direction of the energy storage device.

On account of this arrangement, the current interface is disconnected automatically and without further manipulations in the case of a removal of the energy storage unit from the drive unit, which removal takes place along the removal direction which runs coaxially with respect to a longitudinal axis of the lower tube and is therefore linear, and the current interface is likewise re-established automatically during the insertion of the energy storage device. This decisively facilitates the handling of the energy storage device both during assembly and also in daily operation of the bicycle. Furthermore, as a result, simplified plug devices can be used and exposed cable lengths can be omitted, which likewise contributes to cost reductions and to the improvement of the reliability of the drive unit.

In order to provide sufficient installation space for an energy storage device which is as large as possible, a motor device with a compact design is preferably used for the drive unit. In this regard, what are known as concentric or coaxial drive units are particularly advantageous, in the case of which the motor device and the usually required step-down transmission, or the respective output shafts, are arranged coaxially with respect to the bottom bracket shaft and concentrically with respect to the bottom bracket shaft, respectively.

As an alternative, the motor device of the drive unit can also have an output shaft which is arranged axially parallel to, but offset with respect to, the bottom bracket shaft. Motor devices with output shafts which are oriented axially parallel to the bottom bracket shaft are widespread and inexpensive. It is advantageous in this case for the motor device to be arranged in such a way that the installation space provided for the energy storage device does not overlap with the installation space of the drive unit provided for the motor device.

To this end, the motor device is preferably arranged in such a way that the region of maximum radial extent of the motor device is arranged vertically above the bottom bracket assembly or bottom bracket shaft, and therefore outside the installation space region, preferred in accordance with the present disclosure, for the energy storage device. In the case of a substantially vertical orientation of this type of the motor device, the housing of the motor device can extend partially into a region, in which, in the case of suspended bicycle frames, a main pivot bearing for the rear frame suspension system is usually arranged. This embodiment is therefore suitable, above all, for bicycles with an unsuspended rear frame, what are known as hardtail bicycles, in the case of which the main pivot bearing of the rear frame suspension system does not lie in the abovementioned region.

It is provided in accordance with a further preferred embodiment that the housing of the motor device or the common housing of the motor device and the energy storage device at the same time has or forms an interface or pivot mount for a main pivot bearing or for a swing arm of the rear frame suspension system of a suspended rear frame.

This advantageously results in a further functional integration with at the same time a weight reduction and saving of installation space and costs. In addition, the desirably high torsional and lateral rigidity of the rear frame suspension system and the entire bicycle frame is improved in this way.

In accordance with a further preferred embodiment, the energy storage device contains substantially prismatic shaped energy storage cells, the definition of "prismatic" also comprising, in particular, cylindrical shapes. Here, the energy storage cells are arranged in such a way that the longitudinal axes of a predominant part of the energy storage cells run substantially axially parallel to the bottom bracket shaft. If all the energy storage cells are not arranged axially parallel to the bottom bracket shaft, it is provided that the longitudinal axes of the remaining energy storage cells run substantially parallel to a direction which is at right angles with respect to the bottom bracket shaft.

In the case of energy storage cells which are oriented in a mixed manner axially parallel to and at a right angle with respect to the bottom bracket shaft, the ratio of the number of energy storage cells arranged axially parallel to the bottom bracket shaft to the number of energy storage cells arranged at a right angle with respect to the bottom bracket shaft has a value of between 3 and 5 to 1.

A cell packing configuration which permits both flexible and optimum utilization of the available volume in the bottom bracket region is achieved by way of a position of this type of the energy storage cells which is predominantly or entirely parallel to the bottom bracket shaft.

The orientation of the polarity of the energy storage cells can be selected here as required, by the positive and negative pole sides of the energy storage cells preferably pointing alternately to the left/right or forwards/rearwards or upwards/downwards.

Furthermore, the present disclosure relates to a bicycle frame or a frame interface unit. A frame interface unit can be, for example, a preferably single-piece arrangement consisting of shaped elements, tubes and lugs, which arrangement has firstly interfaces for connecting to the drive unit and secondly inclined locations for connecting to the bicycle frame, in particular to the lower tube and to the saddle tube of the bicycle frame.

The bicycle frame or the frame interface unit has a rear drive unit interface arrangement and a front drive unit interface arrangement for connecting to a drive unit as described in the above text.

Accordingly, the bicycle frame or the frame interface unit has precisely two drive unit interface arrangements, namely a rear drive unit interface arrangement and a front drive unit interface arrangement, which define an (imaginary) front fixation axis and an (imaginary) rear fixation for fastening the drive unit.

It is possible for all of the degrees of freedom of movement of the drive unit with respect to the bicycle frame or with respect to the frame interface unit to be fixed via the rear drive unit interface arrangement, apart from one remaining freedom of movement of the rotation about the rear fixation axis. Accordingly, the front drive unit interface arrangement is configured as a torque support for fixing the remaining rotary freedom of movement.

This means that the rear frame interface arrangement transmits approximately all the forces and torques from and to the drive unit, and fixes all the dimensional and tolerance relationships between the drive unit and the bicycle frame or the frame interface unit, apart from torques about the rear fixation axis as rotatory axis and the only possible rotatory movement about the rear fixation axis.

This enables, unlike in the prior art, clear fixing, in particular, of all the load paths and a clear assignment of all the essential tolerance relationships with respect to the rear frame interface, while the front frame interface of a torque cantilever has to transmit merely comparatively only low forces and is subject to only low requirements with regard to accuracy and tolerances.

Here, the precisely two fixation axes of the bicycle frame or the frame interface unit are preferably arranged analogously with respect to the arrangement of the fixation axes in the case of the drive unit, as described in detail in the above text with regard to the drive unit. The support factor and the chain pull factor of the bicycle frame or the frame interface unit preferably likewise exist in identical magnitudes as derived further above in the case of the drive unit.

The bicycle frame or the frame interface unit preferably includes pivot mounts for a swing arm of a suspended rear frame. In particular in the case of the frame interface unit, this enables a particularly compact and reduced-weight configuration of a suspended rear frame with at the same time a reduced cost expenditure in comparison with the prior art.

Furthermore, the present disclosure relates to a slide-in energy storage device for a drive unit as described in the above text. The energy storage device particularly preferably has those features which have already been mentioned further above in the description of the preferred features of the drive unit, and which will be described in detail in the following description of the figures.

FIG. 1 shows a mountain bike with an electric assistance drive according to the prior art. The mountain bike has a main bicycle frame 1 with a rear frame 2 which is suspended by a spring/damper device DS. The drive train 3 of the mountain bike includes a chainring RC, a rear derailleur 4, a multiple pinion cassette 5 and a drive chain 6.

Furthermore, the mountain bike is equipped with an electric motor unit UM which assists the rider and includes an electric motor device and mini which is configured as a mid-motor, that is to say is arranged in the region of the bottom bracket assembly AB, or includes the bottom bracket assembly AB. The motor unit UM is assigned an energy storage device SEA. In order to control the motor ME and/or the energy storage device SEA, the motor unit UM is assigned a control device CMB which, for example, is positioned in or on the housing of the electric motor device ME.

The energy storage device SEA is arranged in the interior of the lower tube TL of the bicycle frame 1, and can be removed from the lower tube TL in the removal direction DR substantially radially in relation to the lower tube TL, and can be reinserted in the reverse direction.

To this end, it is required that the lower tube TL has a tube cross section which is open toward the front and bottom and is, in particular, U-shaped, with the disadvantages described in the introduction to the description, in particular, with regard to decreased rigidity and/or weight increase of the bicycle frame.

Moreover, a comparatively complicated sealing mechanism of the lower tube TL with respect to penetrating dirt or water, and a likewise complicated electrical attachment with cabling and releasable plug-in devices, and a mechanical locking device for the energy storage device SEA in the lower tube TL are required.

The positioning of both the motor unit UM and the energy storage device SEA in front or far in front of the bottom bracket assembly AB leads to the center of gravity CGEA, illustrated in FIG. 1, of the energy storage device SEA, or to the common center of gravity CGCA of the motor unit UM and the energy storage device SEA. It becomes clear that the center of gravity of the bicycle is moved very far upwards and forwards by way of these assemblies which have a considerable mass of typically approximately from 5 to 8 kg. This entails the disadvantages shown in the introduction to the description, in particular with regard to handling and riding safety.

Figure 2:
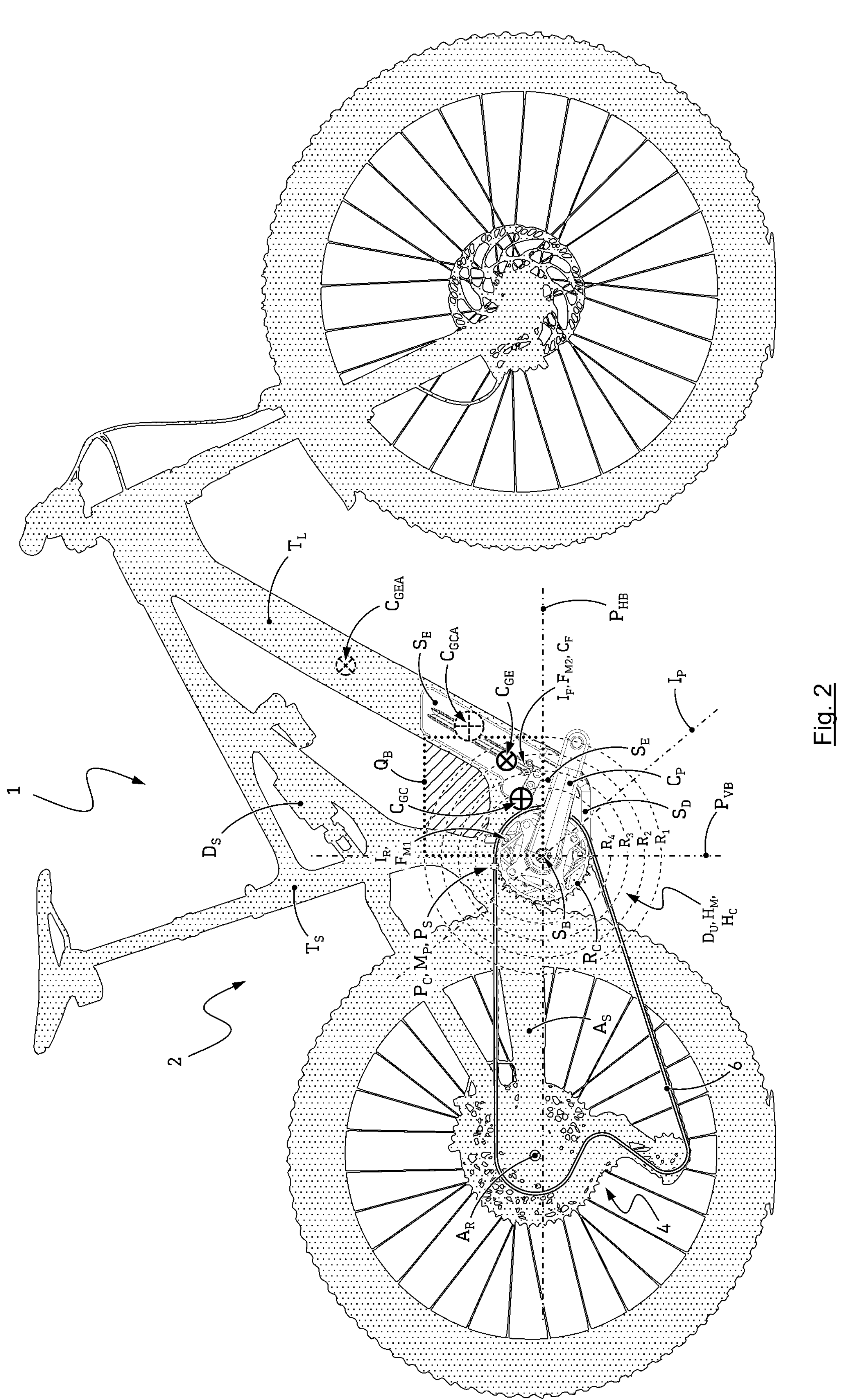
FIG. 2 shows a diagrammatic outline of an E-mountain bike with an exemplary embodiment installed into it of a drive unit with an integrated slide-in energy storage device.

FIG. 2 shows a diagrammatic illustration of the essential assemblies and components of an E-mountain bike which is equipped with one embodiment of a drive unit DU in accordance with the present disclosure.

FIG. 2 shows one preferred embodiment, installed into an E-mountain bike, of a drive unit DU with an integrated energy storage device SE. The drive unit DU is connected to the bicycle frame 1 and two frame interfaces in the regions of two imaginary fixation axes FM1 and FM2. In some of the following figures, the rear fixation axis FM1 is provided in each case with diamond-shaped line ends for improved clarification, while the front fixation axis FM2 is provided in each case with circular line ends.

FIGS. 3 to 16 show different views, exploded and sectional illustrations of the drive unit DU according to FIG. 2. Some of FIGS. 3 to 16 show only parts of the drive unit DU according to FIG. 2, or installation situations of the drive unit DU according to FIG. 2 in a bicycle frame or in a frame interface unit IU are shown.

Figure 3:
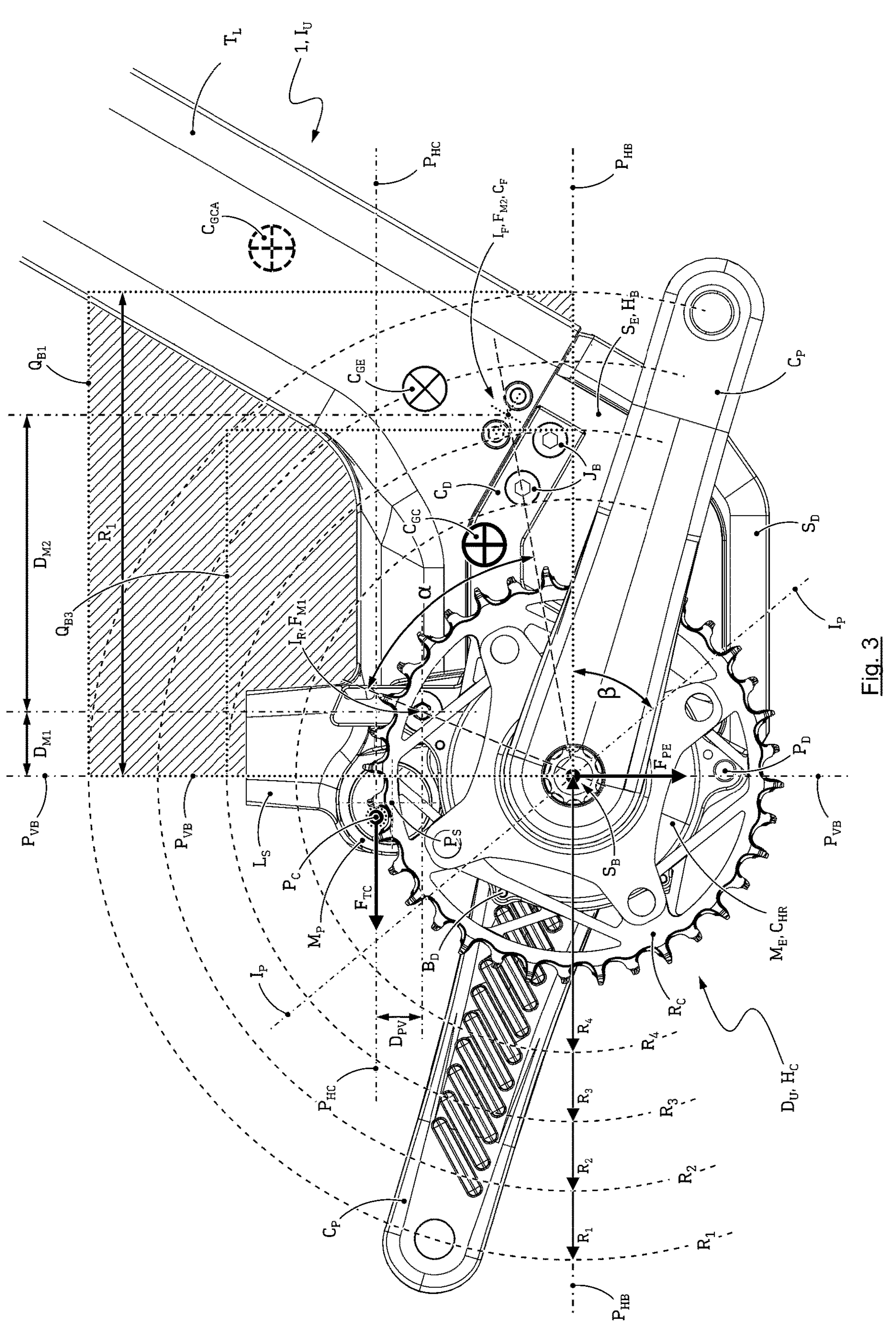
FIG. 3 shows the drive unit according to FIG. 2 in a side view from the drive side.
Figure 4:
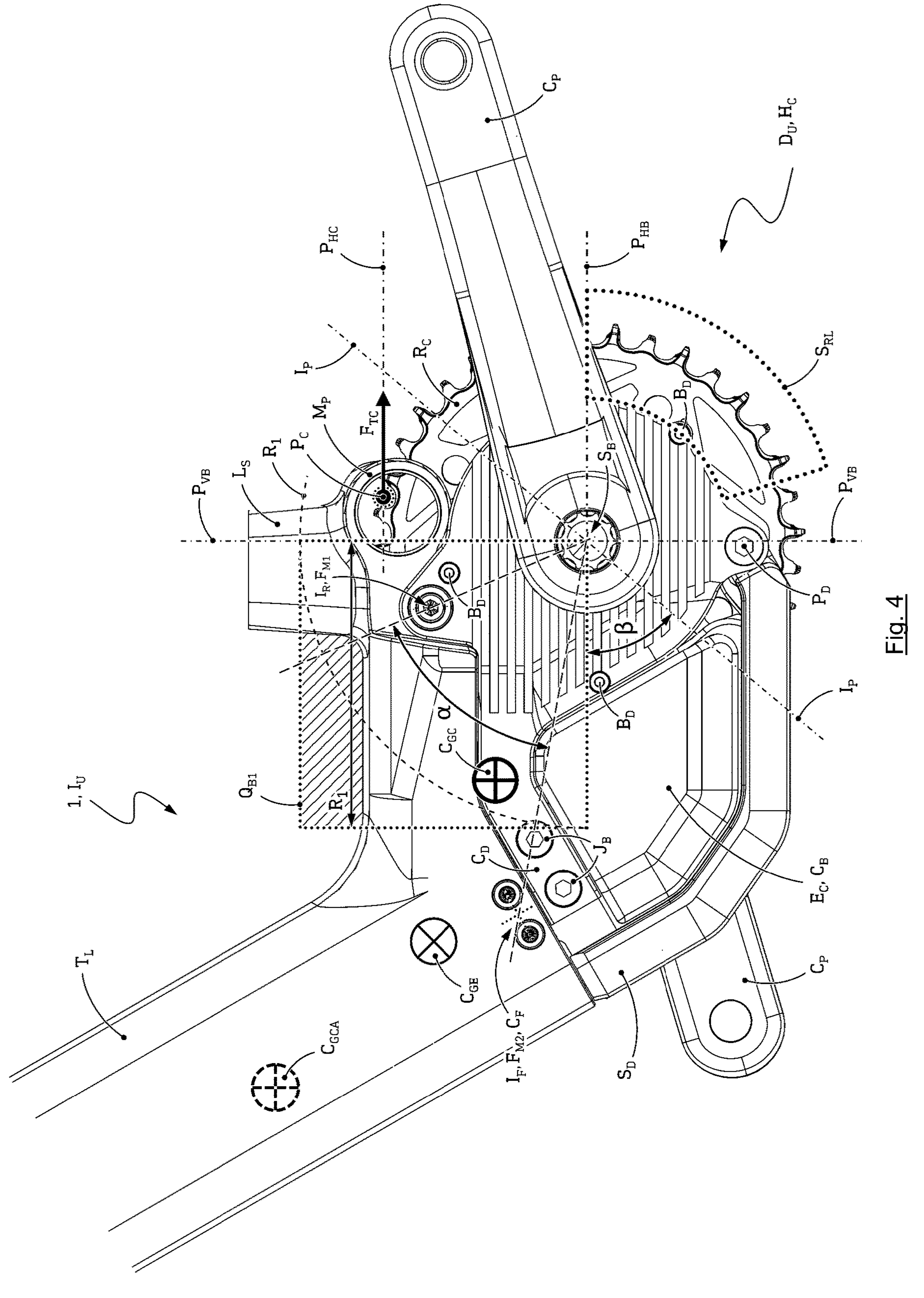
FIG. 4 shows the drive unit according to FIG. 2 in a side view from the non-drive side.

FIG. 3 shows the bottom bracket region, defined by a dashed circle with the radius R1=175 mm, from FIG. 2 in an enlarged illustration from the right-hand or drive side, while FIG. 4 shows the bottom bracket region according to FIGS. 2 and 3 from the left-hand or non-drive side.

First of all, a bicycle frame 1 can be seen in FIG. 2, with a rear frame suspension system DS, 2 in a similar manner to the frame 1 which is shown in FIG. 1.

It can already be seen in FIG. 2 and more clearly in FIGS. 3, 4, 8, 9, 10, 14 and 16 that a considerable reduction in the complexity and therefore the mass and the costs, in particular, of the bicycle frame is achieved by way of the drive unit DU, by virtue of the fact that the further fixation axes or suspension points which are customary in the prior art in a rear region of the drive unit DU, in particular behind an imaginary vertical plane PVB which runs through the bottom bracket shot SB, are omitted or shifted in front of this vertical plane PVB.

This results in a considerable reduction in the component and installation space volume required in the prior art behind the vertical plane PVB, in particular also along the rear frames strut between the bottom bracket shot SB and the rear wheel axle AR according to FIGS. 1 and 2, and therefore a greater design freedom for the layout and geometry of suspended rear frames 2 to according to FIGS. 1 and 2.

The drive unit DU in accordance with the present disclosure not only does not require any fastening axes or suspension points in the installation space behind the bottom bracket shaft here, that is to say behind the imaginary vertical plane PVB according to FIGS. 2 to 4 and 8 and 9, but rather, in particular, does not require any fastening axes or suspension points in an installation space SRL behind and below the bottom bracket shaft either (cf. FIG. 4), which fastening axes and/or suspension points are required in the region PVB in most cases in drive units according to the prior art.

Especially the fastening axes or suspension points on the bicycle frame 1 which are required in the installation space SRL behind and below the bottom bracket shaft in drive units from the prior art lead to considerable installation space used, to undesired extension of the rear frame struts, to a weight increase of the bicycle frame 1, and to complications with regard to the articulation of the rear wheel suspension system.

The interfaces, called "fixation axes" in the present disclosure, between a drive unit DU and a bicycle frame 1 do not necessarily have to be strictly axis-shaped fastenings or interfaces.

Rather, the term "fixation axes" in the present disclosure is intended to imply connecting arrangements on a drive unit DU, on a bicycle frame or on a frame interface unit IU, which connecting arrangements are substantially spaced apart in general from one another along the longitudinal axis and/or along the vertical axis of the bicycle and are functionally separate.

Here, in particular, each connecting arrangement of this type usually in turn includes a plurality of connecting structures, spaced apart from one another along a transverse axis of the bicycle frame, between the drive unit DU and the bicycle frame, cf. drive-side connecting structures IR and IF and frame-side connecting structures IDR and IDF which are apparent particularly clearly from FIGS. 7, 11, 13 and 16 and are described in detail further below.

These connecting structures which can be, for example, bolt joints do not necessarily have to be arranged along axes which run in the transverse direction of the bicycle. Rather, the longitudinal axes of connecting structures of this type, for example bolt joints, can also run, for example, within longitudinal planes, in relation to the bicycle 1.

In particular, a front connecting structure IF, IDF can include one or more fixation axes. If the front support axis arrangement includes a plurality of fixation axes, their common centroidal axis defines the position of the front fixation axis which is imaginary in this case.

The rear frame interface arrangement IR, and accordingly also the rear drive unit interface arrangement IDR of the frame interface unit IU, preferably lies here on a rectilinear fixation axis FM1 (cf. FIGS. 16, 5, 7 and 11 to 13).

In comparison with the prior art according to FIG. 1, it already becomes clear from FIG. 2 that the center of gravity CGE of the battery SE, and the common center of gravity CGC of the drive unit DU including the battery essay, in accordance with the present disclosure lies decisively lower and considerably further to the rear in the bicycle 1 than the corresponding centers of gravity CGEA and CGCA in the prior art. The center of gravity CGCA according to the prior art is also illustrated again using a dashed line in FIGS. 3, 4 and 8.

As a result of this center of gravity CGC which is achieved in accordance with the present disclosure and is situated extremely far to the bottom and to the rear in the bicycle 1, the disadvantages shown in detail in the introduction to the description of known E-mountain bikes are decisively improved or eliminated, in particular with regard to handling and riding safety.

Figure 8:
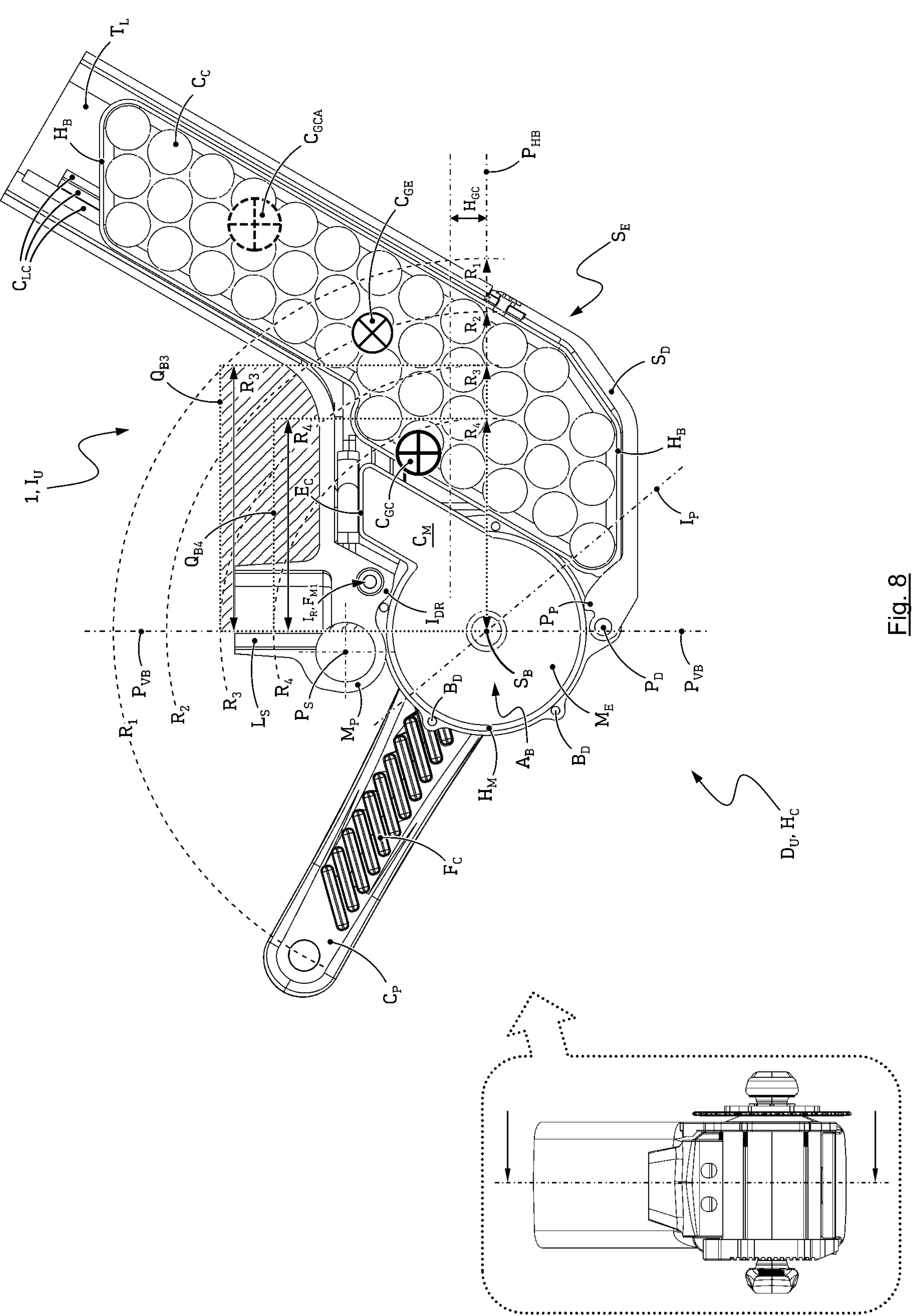
FIG. 8 shows the drive unit according to FIG. 2 in a cross-sectional illustration and the associated sectional course.

In FIGS. 2, 3 and 8, circumcircles R1, R2, R3 and R4 with radii of 175 mm, 150 mm, 125 mm and 100 mm are illustrated using dashed lines, which circumcircles each define a bottom bracket area, within which the center of gravity CGE of the energy storage device SE and the center of gravity CGC of the drive unit DU are preferably situated when the drive unit DU is considered in a position which corresponds to a mounted position on the bicycle of the drive unit DU, for example according to FIG. 2.

It can be seen from this that the center of gravity CGC of the drive unit DU according to FIGS. 2 to 16 is situated within the smallest circle R4, that is to say within a distance of less than 100 mm from the rotatory axis of the bottom bracket shaft SB.

It is apparent here from FIG. 4, in particular, that the mass center of gravity CGC of the drive unit DU including the battery SE advantageously lies within the smallest illustrated quadrant QB4 with the radius R4=100 mm, and therefore in the immediate vicinity of the bottom bracket shaft SB both with regard to its height and with regard to its horizontal position.

It therefore becomes clear that the overall center of gravity CGC of the drive unit DU in accordance with the present disclosure lies decisively lower and further to the rear and therefore advantageously certainly more centrally in the bicycle frame 1 than the corresponding common center of gravity CGCA of the motor unit UM and the battery SEA in the prior art, for example according to FIG. 1.

This entails decisive advantages in relation to the center of gravity problem stated in the introduction to the description in the case of known E-mountain bikes, in particular decisive improvements with regard to handling and riding safety.

In addition, FIGS. 2 to 4 and 8 show an inclined plane IP which contains the rotatory axis of the bottom bracket shaft SB. The inclined plane IP is tilted forwards, in the clockwise direction in a viewing direction of the bicycle from the right, relative to a horizontal plane by an angle β of 50°, and delimits a region in front of and above the bottom bracket SB, within which region the two fixation axes FM1 and FM2 are preferably arranged between the drive unit DU in the bicycle frame 1. The two fixation axes FM1 and FM2 are likewise preferably arranged within an angle α of from 30° to 80°, particularly preferably within an angle α of from 50° to 60°, the vertex of the angle α coinciding with the rotatory axis of the bottom bracket shaft SB, and the angle α being localized in the bottom bracket quadrant QB1.

As is apparent from FIG. 3, in particular, the vertical distance DPV between the rear fixation axis FM1 and the attack point PC of the chain traction force FTC is low, preferably smaller than 30 mm, particularly preferably smaller than 21 mm, in a state of the drive unit DU in which it is mounted in the bicycle.

In a similar way, the horizontal distance DM1 of the rear fixation axis FM1 and the rotatory axis of the bottom bracket shaft SB is also low, preferably smaller than 30 mm, particularly preferably smaller than 18 mm. The bottom bracket shaft SB forms the attack point of the rider weight and drive force, that is to say the effective pedal force FPE, which runs approximately in the bottom bracket axis vertical plane PVB according to FIG. 3.

In this way, the torques which are produced by these two possibly very high forces and which have to be transmitted by the drive unit DU to the frame 1 are minimized. In particular, the chain traction force FTC can readily reach and exceed orders of magnitude of 5000 N in dynamic load cases. The forces and torques generated by the rider and by the chain are therefore introduced by the drive unit DU into the bicycle frame 1 on a shortest path and with a shortest possible lever arm.

As a result of this construction and arrangement of the two fixation axes FM1 and FM2, the torques produced by the chain traction force FTC and the driver weight/drive force FPE are therefore minimized.

This is true on account of the large effective length DM2 of the drive housing cantilever CD which forms a torque support for the main fastening of the drive unit DU to the rear fixation axis FM1, in particular for the reaction forces on the front frame interface arrangement IF. Therefore, the reaction forces which occur at the front frame interface arrangement IF and are therefore comparatively low can be introduced easily into the bicycle frame 1 by way of a preferably purely frictionally locking connection between the drive unit DU and the bicycle frame 1, which connection is additionally subject to only low requirements with regard to the maintenance of dimensional tolerances.

By implication, this means that, of the two frame interface arrangement IF and IR, the customary requirements with regard to force transmission, rigidity and maintenance of tolerances are made merely of the rear frame interface arrangement IR, while the front frame interface arrangement IF is loaded only slightly in terms of force, and is subject to only low tolerance or accuracy requirements.

This specific distribution of tasks to the two frame interface arrangements IF (torque support) and IR (support of all force on a shortest path and dimensional benchmarking) also means that the connection between the drive unit DU and the rear frame interface arrangement IR can ensure particularly high rigidity and a particularly direct flow of forces.

Figure 7:
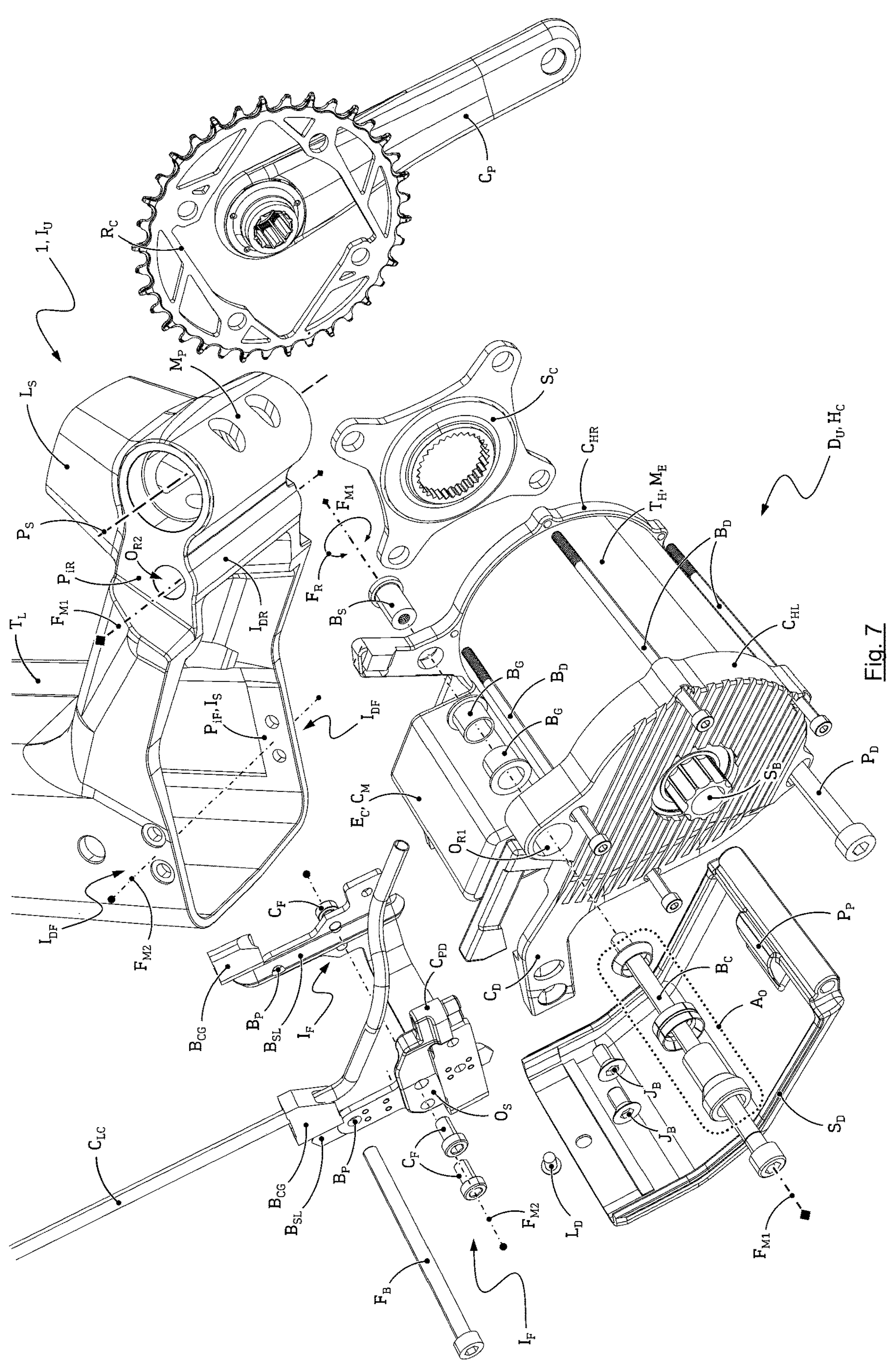
FIG. 7 shows the drive unit according to FIG. 2 in a perspective exploded illustration from the non-drive side.

Furthermore, all the degrees of freedom of movement of the drive unit DU (apart from the rotatory freedom of movement FR about the rear fixation axis FM1, cf. FIG. 7) with respect to the bicycle frame 1 are fixed only by the rear frame interface arrangement IR.

As is apparent from FIG. 7, FIGS. 11 to 13 and, in particular, FIG. 15, the rear frame interface arrangement IR includes a frame offset adapter AO for the variable play-free setting of the clamping action in the axial direction between the drive housing HC and the rear drive unit interface arrangement IDR of the bicycle frame 1.

In this way, the connection which is described in the above text and transmits loads without play in all three spatial directions is established between the drive housing HC and the rear drive unit interface arrangement IDR. The construction and the method of operation of the offset adapter AO are described further below.

Here, the connection between the drive housing HC and the rear drive unit interface arrangement IDR of the bicycle frame 1 by means of the frame offset adapter AO is not only play-free in the axial direction, in relation to the rear fixation axis FM1, that is to say in relation to the longitudinal axis of the offset adapter AO. As a result of a corresponding selection of the fits between the external diameter of the frame offset adapter AO and the bores OR1, OR2 receiving it in the drive housing HC and in the drive unit interface arrangement IDR of the bicycle frame 1, it can be ensured that the connection between the drive housing HC and the rear drive unit interface arrangement IDR is also play-free in the radial direction, in relation to the longitudinal axis of the offset adapter AO.

Here, the frame offset adapter AO serves, in particular, the task of compensating for any tolerances present on the bicycle frame 1 or on the drive unit interface arrangement IDR, in particular in relation to the support width WS (cf. FIGS. 11 to 13 and 15B).

This tolerance compensation is of considerable importance, since the drive unit DU can be combined in practice on the bicycle market with a very wide variety of vehicle frames 1 or with possibly a very wide variety of frame interface units IU, it being possible for the bicycle frames 1 or possibly the frame interface units IU to come from or be supplied by a very wide variety of manufacturers.

Here, according to experience, depending on the origin or manufacturer of the vehicle frame 1 or the frame interface units IU, this results in a very wide variety of tolerance situations in relation to the support width WS. Different tolerance situations of this type can be compensated for simply and in an infinitely variable manner by way of the offset adapter AO.

As stated in the above text, the front frame interface arrangement IF of the drive unit DU serves merely for torque support via the drive housing cantilever CD, and therefore for fixing the sixth freedom of movement of six degrees of freedom FR of movement of the drive unit DU with respect the bicycle frame 1. On account of the great horizontal distance DM2 (cf., in particular, FIG. 3) between the front frame interface arrangement IF or front fixation axis FM2 and the rear frame interface arrangement IR or rear fixation axis FM1, this results here in only low reaction forces which are to be supported at the front frame interface arrangement IF.

In contrast, three fixation axes for connecting the drive unit and the bicycle frame are usually used in the prior art, in the case of which, unlike in the case of the present disclosure, however, no specific division of tasks is made among the different fixation axes with regard to force transmission, torque transmission and fixing of the degrees of freedom of movement of the drive unit relative to the bicycle frame.

In particular, no clear load path exists in the case of these known drive units for the introduction of the forces and torques from the drive unit into the bicycle frame 1. Rather, in the prior art, the actual load path and the question of which suspension point or which fixation axis transmits which proportion of the forces and torques is substantially dependent on random tolerance conditions and distributions between the usually three largely equal fixation axes on the drive unit and on the bicycle frame 1.

In the prior art, this frequently results in considerable difficulties with regard to the tolerance compensation during the mounting of the drive unit on the bicycle frame 1, and with regard to a permanently fixed and play-free connection between the drive unit and the bicycle frame 1.

In addition, in the prior art, one of the three fastening axes which are usual there for connecting the drive unit and the bicycle frame is situated in a region behind or even considerably far behind the vertical plane PVB (cf. FIGS. 2 to 1 and 8) which contains the rotatory axis of the bottom bracket shaft SB, typically more than approximately 50 mm behind this vertical plane PVB, and frequently even below the horizontal plane PHB which contains the rotatory axis of the bottom bracket shaft SB.

This means that the bicycle frame 1, or a frame interface unit IU of the bicycle frame, has to be constructed around the bottom bracket as far as comparatively far behind the bottom bracket and frequently even as far as behind below the bottom bracket height, in order to provide the required fixation axis or fixing receptacle there for connecting to the drive unit.

An extension or protuberance of this type (also known in the branch as a so-called "frame lug") of the frame behind and below the bottom bracket in the region SRL (cf. FIG. 4), in order for it to be possible for the drive unit to be fastened there, is complex to manufacture, however, in particular if it is intended to at the same time fulfil the stated high requirements with regard to maintenance of tolerances and absorbing of forces. In addition, an extension or protuberance of this type of the frame is in conflict with the receptacle, usually arranged in the same installation space region, for the rear swing arm pivot mount MP (cf. FIGS. 1 to 10), which can make it structural design and optimisation decisively more difficult.

This above-described, problematic conflict situation is solved by way of the drive unit DU in accordance with the present disclosure, by virtue of the fact that particularly preferably precisely two frame interface arrangement IR, IEF or precisely two imaginary fixation axes FM1, FM2 are provided.

Of these, the rear frame interface arrangement IR or fixation axis FM1, as stated in the above text with reference to FIG. 3, is positioned very close to the substantial force attack lines both of the chain traction force FTC and also the drive weight and drive force FPE, and assumes all tolerance compensation and force transmission tasks, just like the fixing of all degrees of freedom of movement of the drive unit DU, apart from the rotatory freedom of movement FR about the rear fixation axis FM1, cf. FIG. 7. Therefore, the front frame interface arrangement IF can be configured in the form of a comparatively light torque cantilever which is subject to only low tolerance requirements and is merely required to fix the remaining rotatory freedom of movement FR of the drive unit DU.

Accordingly, the drive unit DU has precisely two frame interface arrangement IR, IF or fixation axes FM1 and FM2 which are configured to connect to in each case associated drive unit interface arrangements IDR, IDF of the bicycle frame or the frame interface unit IU.

As is apparent from FIGS. 3 to 9 and FIGS. 10, 13, 14 and 16, the drive unit DU has a drive shield hatch SD which is arranged behind the battery SE.

The drive shield hatch SD protects the drive unit DU and, in particular, the removable battery SE, and at the same time forms a movable hatch for the purpose of battery securing and battery removal.

As is apparent, in particular, from FIGS. 8 to 10 and FIG. 14, the drive shield hatch SD is fastened in its rear region by a pivot bearing PD directly to the common housing HC of the motor ME and the battery SE, and is fixed in its front region by a latch arrangement LD on the drive housing HC.

This embodiment of the drive shield hatch SD is advantageous in multiple ways. First of all, the considerable forces which occur, in particular, when the bicycle comes into contact, for example, with obstacles in the bottom bracket region, which certainly occurs frequently when used in a sporty manner, are therefore introduced directly from the drive shield hatch SD via the fastening interfaces PD, LD of the drive shield hatch SD on the drive housing HC into the drive housing HC, and from the latter via the frame interface arrangement IR, IF of the drive unit DU and via the drive unit interface arrangement IDR, IDF directly into the bicycle frame 1. Since both the drive housing HC with the frame interface arrangement IR, IF and the drive unit interface arrangement IDR, IDF are designed to absorb high forces, forces of this type which occur, for example, in the case of grounding of the bicycle can be absorbed without problems and can be introduced safely into the bicycle frame 1.

In addition, the bicycle frame 1 is relieved of load considerably by virtue of the fact that the rider frequently stands on the pedals when the bicycle comes into contact with an obstacle in the bottom bracket region. Here, thanks to the fastening of the drive shield hatch SD to the drive housing HC, the impact forces can be introduced directly via the pivot bearing BR, BL of the bottom bracket shaft SB from the drive housing HC into the bottom bracket shaft SB and from there into the damping and cushioning legs of the rider.

In the prior art, in contrast, drive shields are usually not connected to the drive housing, but rather directly to the bicycle frame 1. For this reason, there is a considerable risk in the prior art of the bicycle frame being damaged, for example, when grounding on obstacles.

An air gap is preferably situated between the drive shield hatch SD and the battery SE, at least over the self-supporting length of the drive shield hatch SD, in order that the self-supporting length of the drive shield hatch SD can yield elastically in the case of impact forces occurring, and can correspondingly absorb the impact forces without a collision of the drive shield hatch SD with the battery SE and impermissibly high mechanical loads of the battery SE occurring.

As an alternative, an at least partial dissipation of impact forces via the self-supporting region of the drive shield hatch SD to the battery SE is also possible. To this end, the battery housing HB is of correspondingly robust configuration, and a damping elastomer intermediate layer which distributes the force is preferably provided at least between the self-supporting region of the drive shield hatch SD and the front lower region of the battery SE.

By way of the drive shield hatch SD in accordance with the present disclosure, in addition, the further mechanical interfaces, usually required in the prior art (cf. FIG. 1), between the bicycle frame 1 and the battery SE for the purpose of battery fastening can be dispensed with, as a result of which complexity, costs and possible fault sources are further decreased decisively.

The drive shield latch SD is preferably provided with a push-in protrusion PP (cf. FIGS. 7 to 10) which facilitates the insertion of the battery SE. At the conclusion of the closure of the drive shield hatch SD, a lever effect which boosts the manual force takes place by way of the push-in protrusion SP from the drive shield hatch SD to a pressing surface SP of dimensionally corresponding configuration at the lower end of the battery SE, and therefore positive guidance of the battery SE along the push-indirection. On account of this lever action of the drive shield hatch SD, the plug-in force which is required for joining the battery-side plug connector CPB to the drive-side plug connector CPD in a contact-forming manner can be applied easily and reliably when pushing in the battery SE, cf. FIG. 10.

Figure 9:
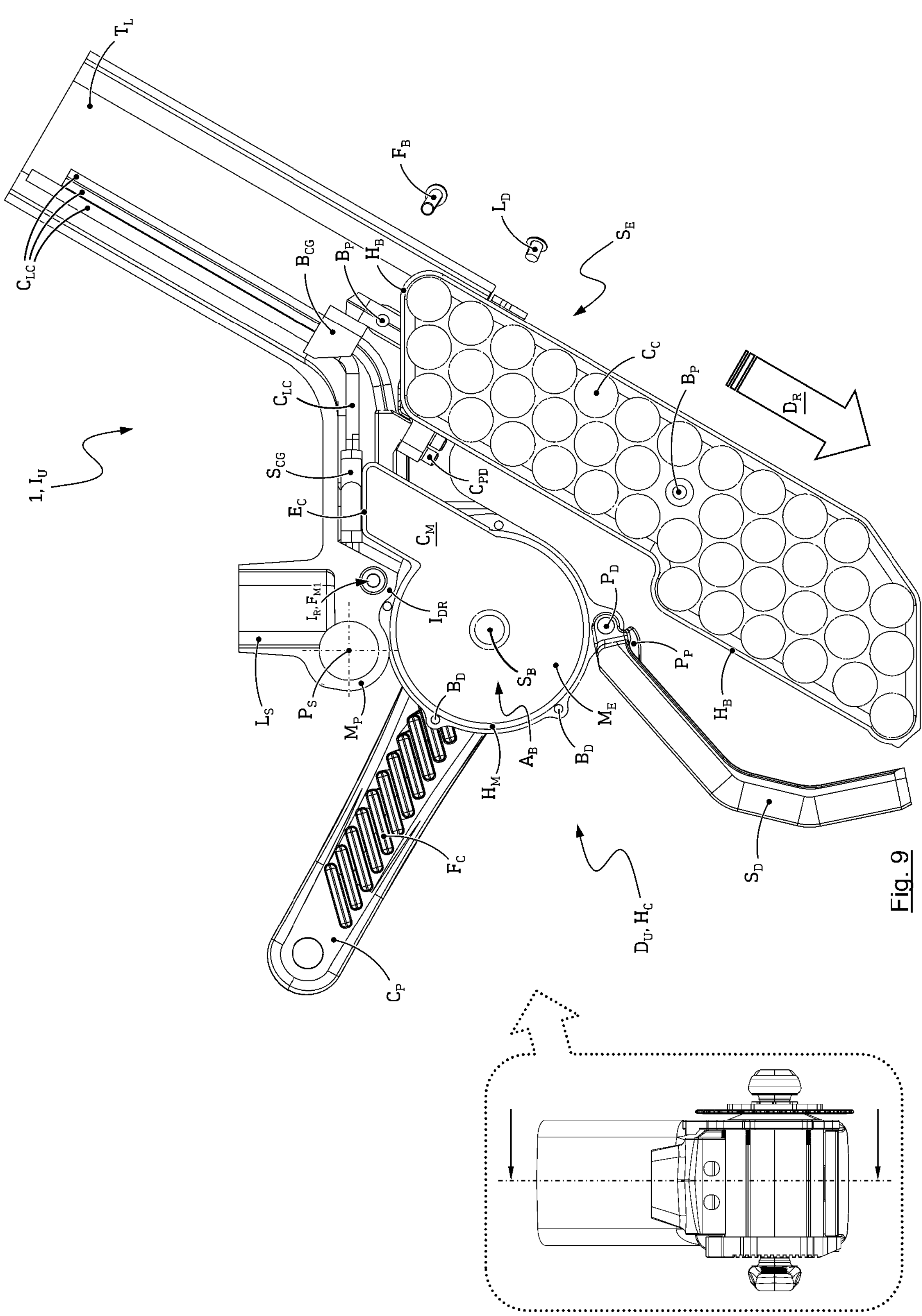
FIG. 9 shows the drive unit according to FIG. 2 FIG.
Figure 10:
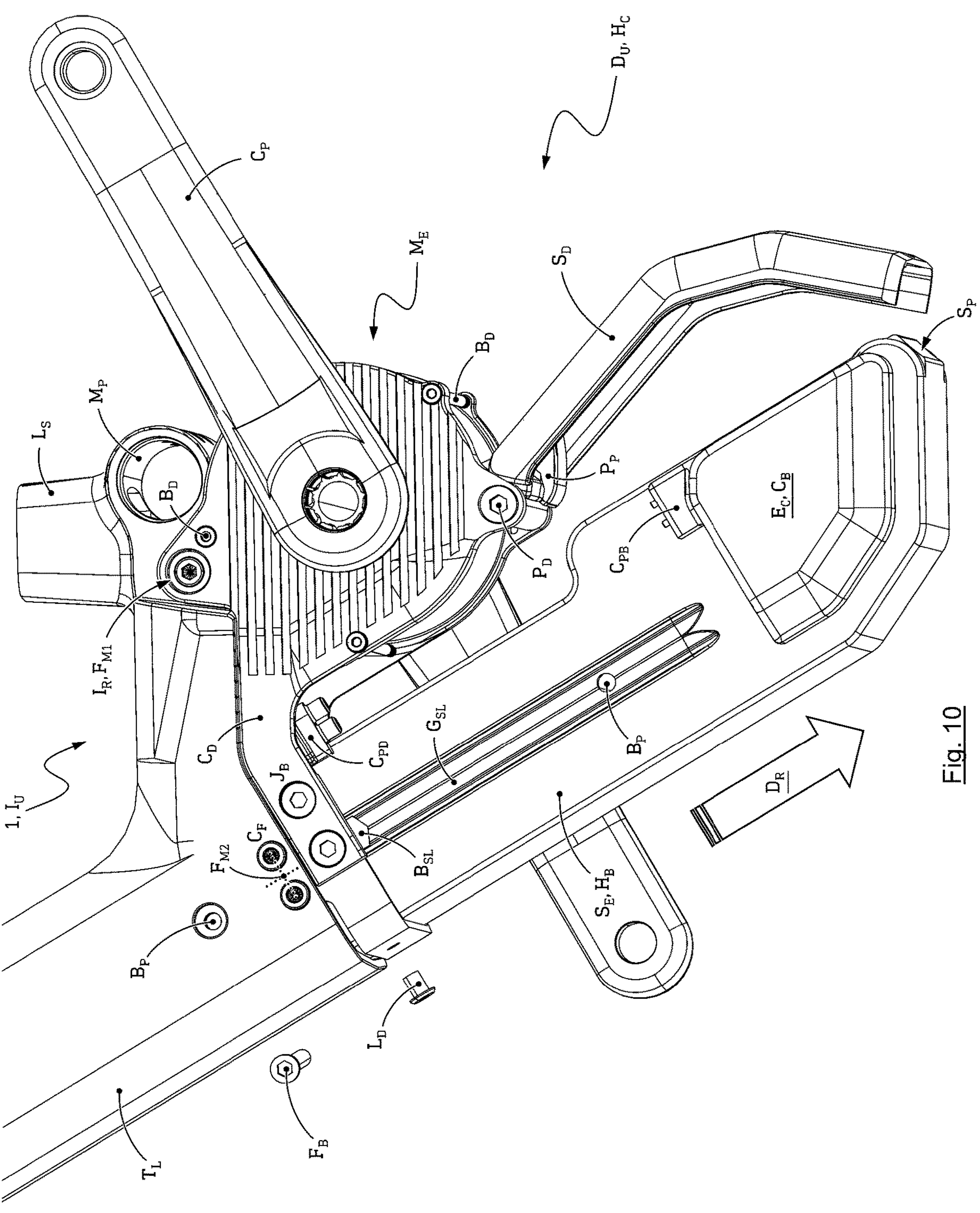
FIG. 10 shows the drive unit according to FIG. in an inclined view from the non-drive side with an open drive shield during battery removal.
Figure 13:
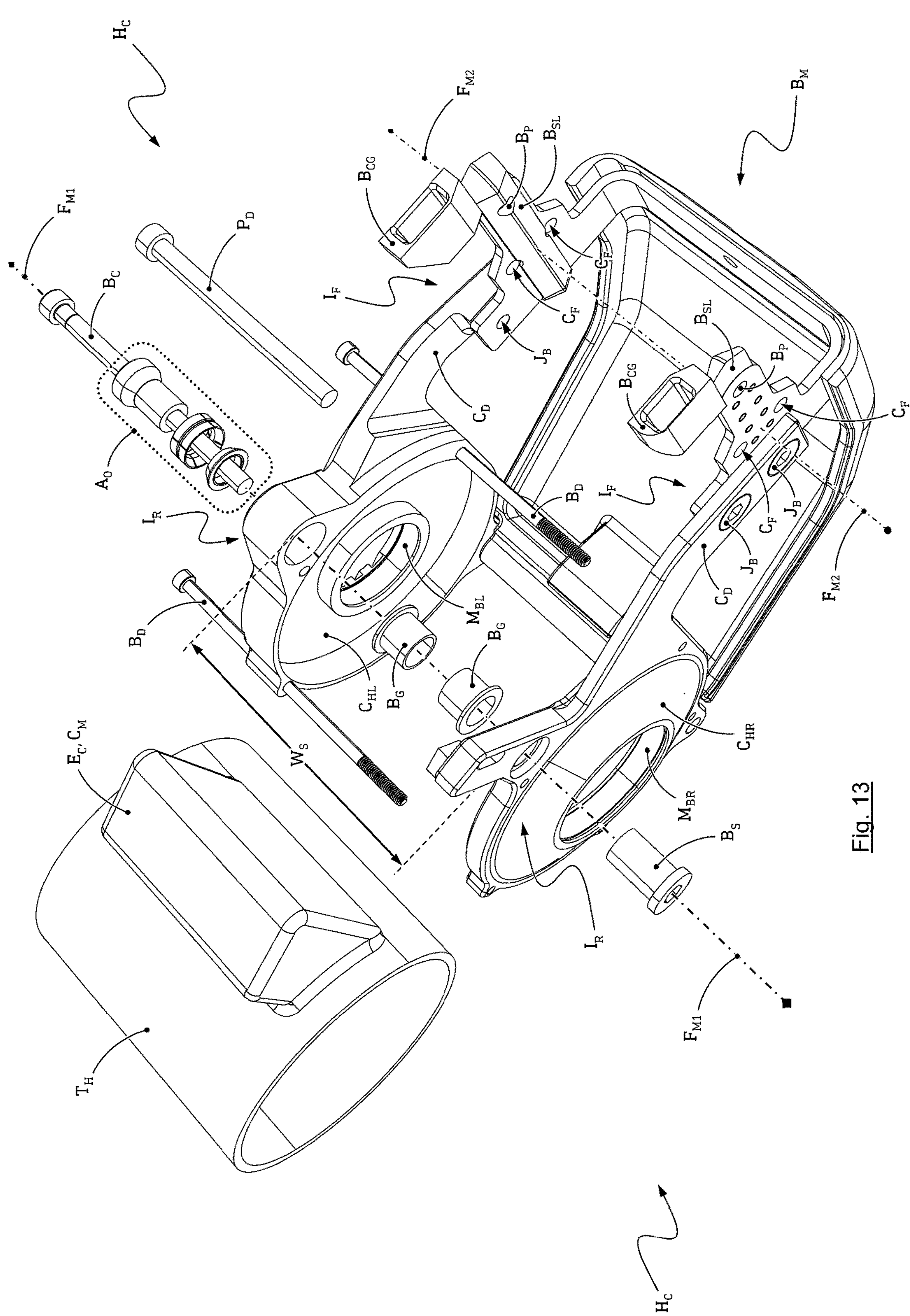
FIG. 13 shows a motor/transmission housing and a tolerance offset adapter of the drive unit according to FIG. 2 in an exploded illustration.

The parallel guidance of the battery SE in the drive housing HC of the drive unit DU by the drive-side sliding blocks BSL and the battery-side sliding guides GSL can also be seen in FIG. 10 (cf. also FIGS. 7, 9 and 13). As results from viewing FIG. 10 in combination with FIG. 9, additional lines such as, for example, electric connecting lines, hydraulic lines for brakes or Bowden cables for derailleurs can be arranged in a region in front of or, in particular, behind the sliding blocks BSL. Cable guide sleeves SCG or cable guide clips BCG can also be provided, which facilitate the insertion of the corresponding connecting lines or cables CLC and/or support the connecting lines or cables CLC during operation of the bicycle.

The threaded bolt FB which is shown in FIGS. 7, 9 and 10 is guided through the penetration bores BP which can be seen in FIGS. 7, 9, 10, 13 and 14 and is tightened when the battery SE has been inserted. In this way, the battery SE is clamped between the two drive-side sliding blocks BSL and is therefore fixed relative to the drive housing HC of the drive unit DU. The penetration bores BP in the bicycle frame 1 or in the frame interface unit IU are configured to be so large here that the threaded bolt FB is not in contact with the bicycle frame 1 or in the frame interface unit IU in the screwed-in-state. This also reduces requirements with regard to the maintenance of accuracy tolerances in the region of the front fixation axes FM2 and in the region of the front frame-side drive unit interface arrangement IDF of the bicycle frame 1 or of the frame interface unit IU.

FIGS. 8 and 9 show, in particular, the battery housing HB (shown in sectioned form here) with battery cells or rechargeable battery cells CC contained therein. As can be seen in FIGS. 8 and 9, the rechargeable battery cells CC are preferably arranged in a hexagonal packing with a minimum mutual distance. Since the hexagonal packing corresponds to the spatial arrangement of cylindrical bodies with the highest packing density, a high battery capacity can be achieved in a small volume as a result.

At the same time, the hexagonal packing together with the arrangement of most or all the rechargeable battery cells CC axially parallel to the bottom bracket shaft makes it possible to impart a shape, which is adapted in an optimum manner to the irregularly shaped spatial boundary conditions between the drive housing HC/TH, the controller housing CMB, the lower tube TL and the lower tube lug LL, to the battery SE.

As a result, the energy content of the battery SE can be maximized, a simple removal of the battery SE from the drive unit DU is ensured (cf. FIGS. 9, 10 and 14), and a fixed and rattle-free enclosure of the battery SE in the drive unit DU is ensured, although no latches or fastening means for the battery are present and required on the bicycle frame.

Figure 16:
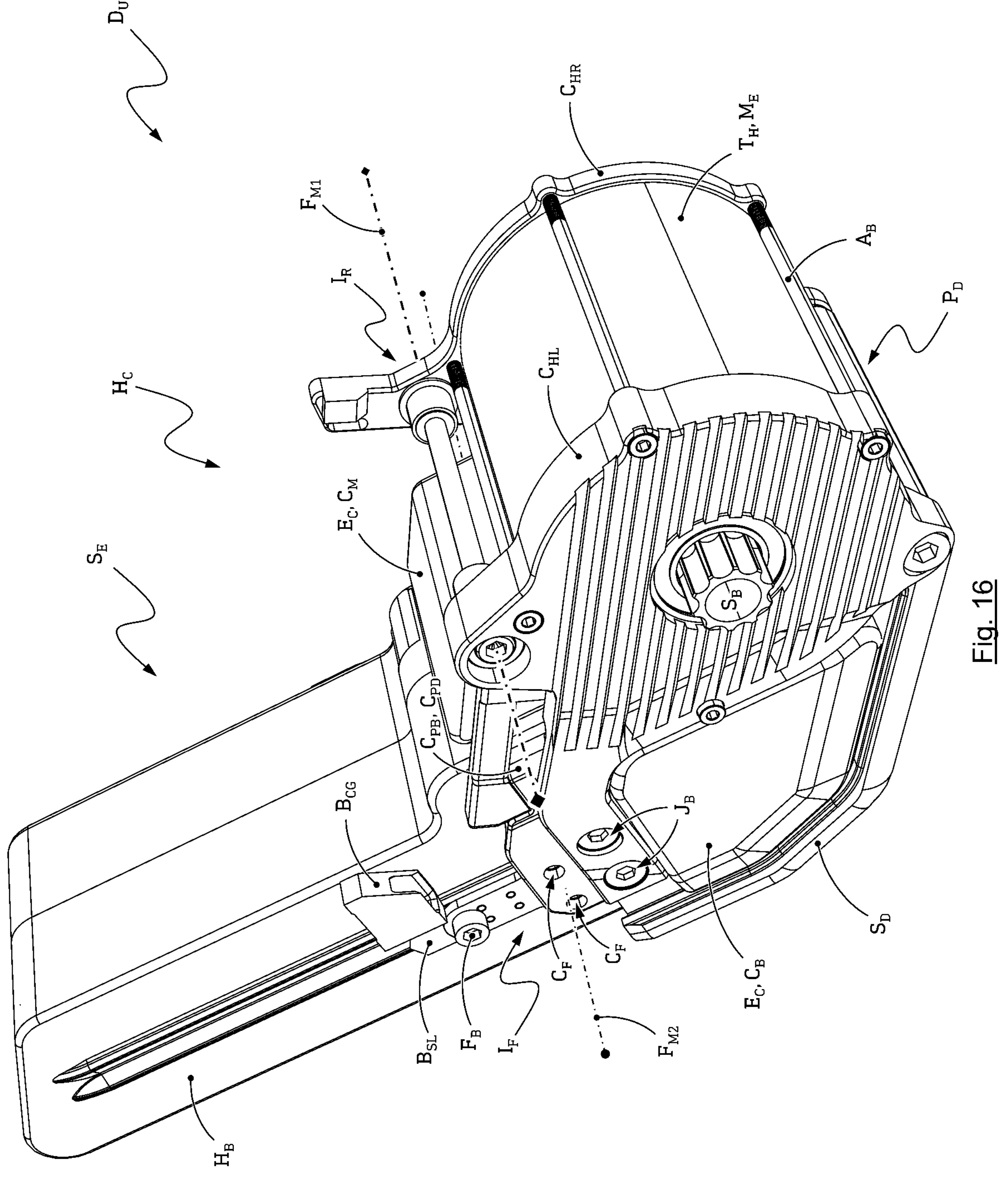
FIG. 16 shows a drive unit, comprising the energy storage device, according to FIG. 2 in an inclined view.

Furthermore, a housing region EC for receiving a controller device CMB for the motor and/or the battery SE is seen in FIGS. 8 and 9 (cf. also FIG. 16). In addition, a battery controller CB (not shown in FIGS. 8/9, cf., for example, FIG. 9, however) which is responsible, in particular, for charging the battery SE can additionally be contained in the battery housing.

According to FIGS. 7, 9, 10, 14 and 16, an electric interface with a battery-side plug connector CPB and a controller-side or drive-side plug connector CPD is situated between the controller device CMB and the battery SE for force transmission and possibly communication between the controller device CMB and the battery SE.

Figure 14:
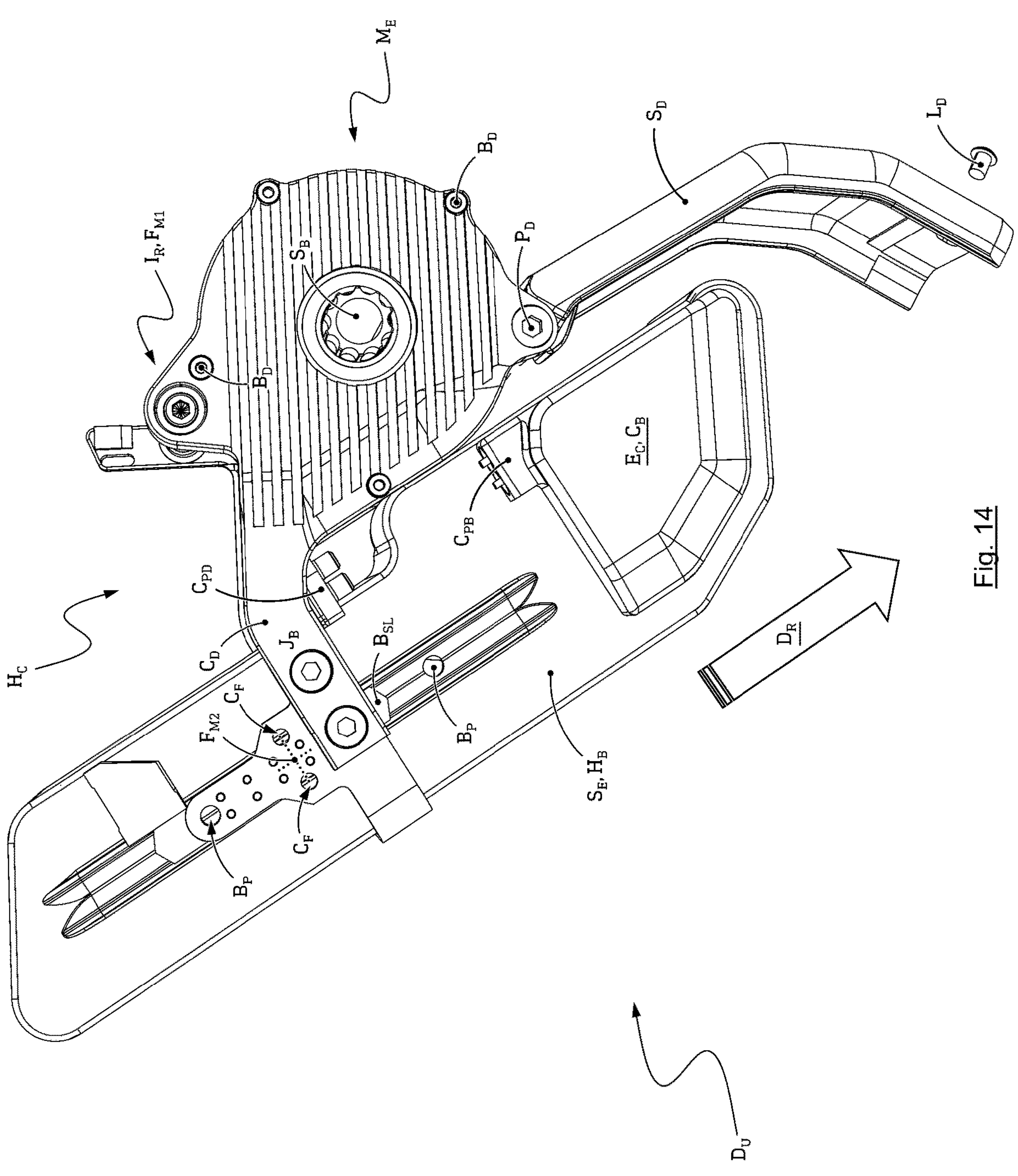
FIG. 14 shows the drive unit according to FIG. 2 in a perspective view with an open drive shield hatch during the removal of the battery.

The electric interface CPD, CPB which is preferably configured in the form of a plug connection is automatically disconnected during opening of the drive shield hatch SD and subsequent lowering of the battery SE in the removal direction DR according to FIGS. 9, 10 and 14.

During the insertion of the battery SE and during the subsequent closure of the drive shield hatch SD, the electric interface CPD, CPB is likewise automatically guided together as a result of the parallel guidance of the battery SE in the drive housing HC of the drive unit DU by the drive-side sliding blocks BSL and the battery-side sliding guides GSL, in a manner which is clearly defined automatically and kinematically, as a result of which operating errors and associated faulty contacting or damage of the interface contacts are ruled out.

In FIG. 10, the drive-side plug connector CPD is shown merely for reasons of illustration displaced a little in the removal direction DR of the battery SE, in order that the drive-side plug connector CPD is not concealed in the drawing of FIG. 10 by the drive housing cantilever CD. In FIG. 7 and FIG. 9, in contrast, the drive-side plug connector CPD is shown in the actual original position in this embodiment, and is therefore situated in a position, in which it is protected against damage, behind the drive housing cantilever CD.

The drive shield hatch SD has a drive shield latch LD which is preferably configured as a bolt which can be easily removed using a customary Allen key for simple opening of the drive shield hatch SD (cf. FIGS. 6, 7, 9, 10 and 14). In this way, the drive shield hatch SD therefore at the same time forms an essential constituent part of the drive housing HC, in particular of its battery compartment for receiving and securing the battery SE.

In contrast to the exemplary embodiment which is shown in the figures, a drive shield hatch SD can also be connected to the battery or can be configured in one piece with a part of the battery housing, with the result that the battery itself also assumes the function of the drive shield hatch SD.

Furthermore, a rear swing arm pivot mount MP can also be seen in FIGS. 3 to 10, which is present in the form of a pivot mount MP which is integrated into the drive housing HC or, in accordance with the embodiment which is shown, into the bicycle frame 1 or into a frame interface unit IU, for pivotable mounting of the suspended rear swing arm 2 of the bicycle frame.

The pivot shaft PS of the rear swing arm AS ideally and therefore preferably runs through, or very close to, the main force attack point PC of the chain traction force FTC on the chainring RC (cf. FIGS. 3 to 6), in order not to cause any undesired compression movements of the rear swing arm AS, in particular in a manner which is dependent on the chain traction force FTC.

The drive housing cantilevers CD serve to fix the sixth (rotatory) freedom of movement FR (cf. FIG. 7) of the drive unit DU with respect to the bicycle frame 1 or with respect to the frame interface unit IU, by the drive housing cantilevers CD being connected to the front drive unit interface arrangement IDF of the bicycle frame 1.

Since the connection of the drive housing cantilevers CD to the front drive unit interface arrangement IDF of the bicycle frame 1, configured as likewise already further above in the case of the discussion of the distribution of tasks of the two frame interface arrangements IF and IR, has to transmit only comparatively small forces and does not have to fulfil any high accuracy requirements or tolerance requirements, it is sufficient and is therefore preferred that the connection between the drive housing cantilever CD and the front drive unit interface arrangement IDF takes place by way of a frictionally locking connection.

In the case of the drive unit according to FIGS. 2 to 16, a frictional contact serves for this purpose, which is established between outer surfaces OS of the frame interface arrangement IF on the drive housing cantilevers CD and corresponding inner surfaces IS of the front drive unit interface arrangement IDF or of the bicycle frame 1, cf. FIG. 7. The frictional contact is produced by way of clamping forces of the bolt connection CF between the front drive-side frame interface arrangement IF and the front frame-side interface arrangement IDF.

As already stated, this connection from the drive housing cantilever CD of the drive housing HC via the front frame interface arrangement IF of the drive housing HC to the front drive interface arrangement IDF of the bicycle frame 1 serves merely for rotatory fixing of the drive unit DU and the introduction of torque starting from the drive unit DU into the bicycle frame. Correspondingly low requirements with regard to the introduction of force and, in particular, accuracy of the tolerances during manufacturing are made of the front drive unit interface arrangement IDF of the frame interface unit IU or the bicycle frame 1.

The preferred connection in the present case between the drive housing cantilever CD and the front drive unit interface arrangement IDF by way of a frictionally locking connection, for example by the bolt connection CF, is advantageous in this regard in so far as it makes only very low requirements of the manufacturing accuracy of the frame-side front drive unit interface arrangement IDF and the drive-side frame interface arrangement IF, that is to say here, in particular, of the accuracy of the frame-side bores and threads of the bolt connection CF.

The connection which is required merely as a torque cantilever for fixing the rotatory degree of freedom FR between the drive housing cantilevers CD and the front, frame-side drive unit interface arrangement IDF also makes merely very low requirements in the axial direction, in relation to the front fixation axis FM2.

On account of their loading which is only low, the drive housing cantilevers CD can be designed, in particular, in such a way that, in the force-free, unmounted state of the drive unit DU, they are at a somewhat too great distance from the interface surfaces or interface planes PiF of the front drive unit interface arrangement IDF. During the mounting of the drive unit DU, the drive housing cantilevers CD are then deformed elastically slightly inwards by way of the force of the bolt connection CF, as a result of which any distance tolerances of the interface planes PiF of the front drive unit interface arrangement IDF can be compensated for generously and easily.

In contrast, the dimensional fixing of the drive unit DU with respect to the frame interface unit IU or with respect to the bicycle frame 1 in all three spatial directions, and the transmission of the force components which run in these spatial directions, take place practically exclusively by way of the connection which is preferably positively locking in all three spatial directions between the rear drive unit interface arrangement IDR and the drive unit DU (cf. FIGS. 7, 11 and 12, 13, 15 and 16).

Only low requirements with regard to accuracy and tolerances are made, in contrast, of the connection between the drive housing cantilever CD and the front drive unit interface arrangement IDF, which, in addition to the advantages described above during the discussion of the distribution of tasks of the two frame interface arrangements IF and IR, also decreases the manufacturing complexity and the manufacturing costs for the bicycle frame 1 or for the frame interface unit IU.

When considered together with FIG. 13, in particular, it is apparent from FIG. 7 that the drive housing HC which here at the same time forms the common housing HC for the motor ME and the battery SE is composed substantially of five main housing parts, namely of two housing covers CHL and CHR, a preferably substantially or completely prismatic housing tube TH, a battery mounting arrangement BM for securing the battery SE and the drive shield hatch SD.

In the case of the exemplary embodiment which is shown, the battery mounting arrangement BM is configured as a substantially U-shaped stamped bent part which is screwed to the housing covers CHL and CHR by means of a bolt connection JB.

The housing covers CH together with the housing tube TH can be connected to the drive housing HC by means of a plurality of drive housing bolting means BD.

As FIG. 13 shows, in particular, the housing covers CH preferably each form, in one piece, in each case one of the drive housing cantilevers CD, and have bearing mounts MBR, MBL, into which a bearing BL for the bottom bracket shaft SB can be received on the left-hand side and a bearing BR for a motor output hollow shaft SHM for driving a chainring RC via a chainring spider SC can be received.

The frame interface arrangements IR, IF, arranged on the drive unit DU, as dimensionally corresponding counterparts to the drive unit interface arrangement IDR, IDF of the frame interface unit IU or the bicycle frame 1 are preferably situated on the housing covers CH of the drive unit DU, as is apparent from FIGS. 13, 14 and 16, in particular. Here, the frame interface arrangements IR, IF are preferably configured in one piece with the housing covers CH.

In this way, inter alia, a desirably maximum support width WS of the connection between the frame interface arrangement IR, IF of the drive unit DU and the bicycle frame 1 or the frame interface unit IU is achieved (cf. FIGS. 11 to 13 and 15B), which optimizes the rigidity of the connection between the bicycle frame and the drive unit DU, and the direct flow of forces.

Figure 12:
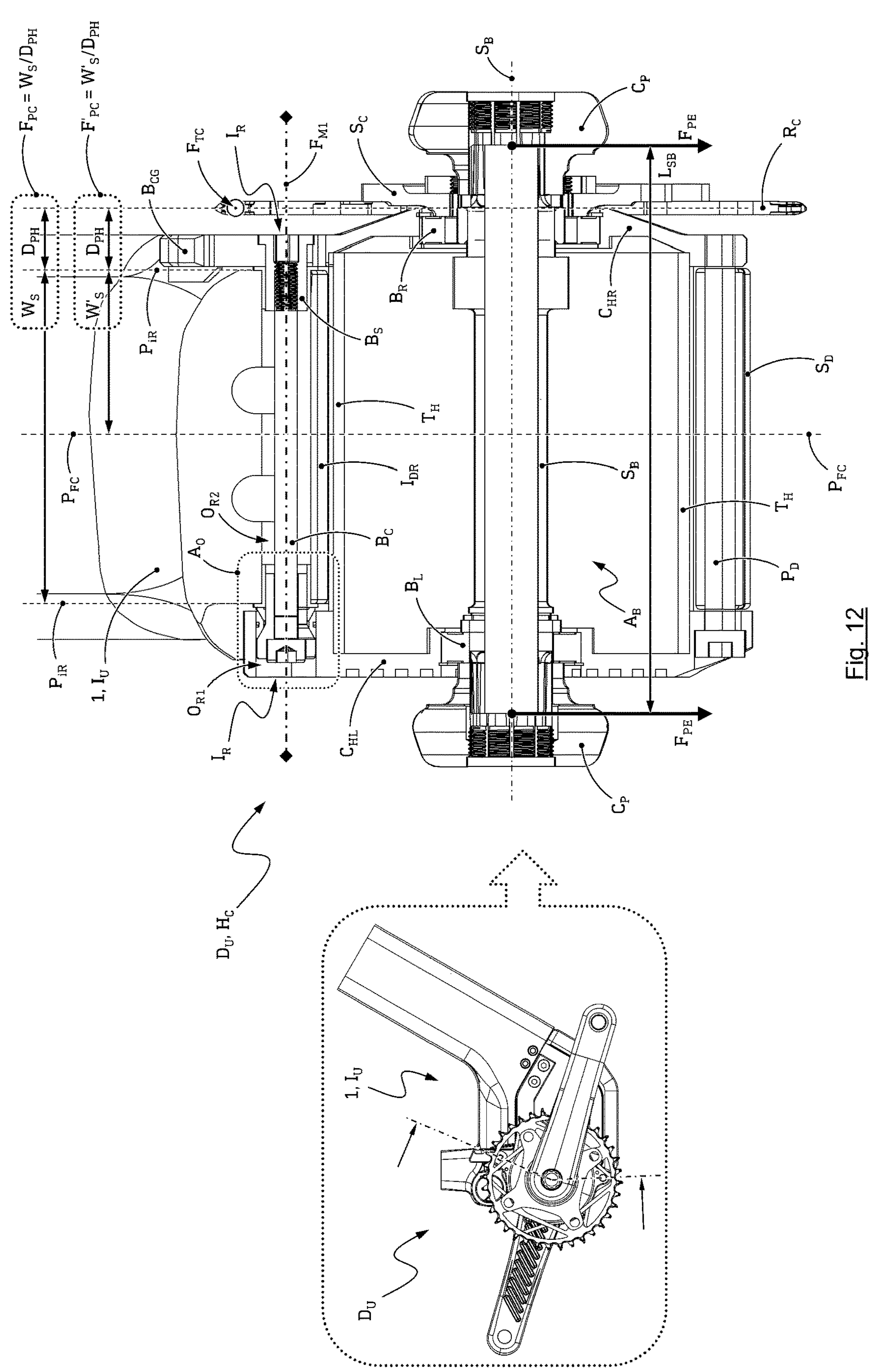
FIG. 12 shows the drive unit according to FIG. 2 in a longitudinal sectional illustration through the drive shield pivot bearing, the bottom bracket shaft and the rear frame interface arrangement, and the associated sectional course.

As shown in FIG. 12, in particular, the drive unit DU can be of asymmetrical configuration in relation to a frame center plane PFC, with regard to its essential dimensions in the transverse direction (along the axis of the bottom bracket shaft SB). Here, essential dimensions in the transverse direction on the left-hand side can be greater than corresponding right-hand-side dimensions. As a result, it becomes possible for the possibly very high chain traction forces FTC to be conducted with a minimum chain pull horizontal distance DPH from the right-hand-side interface plane PiR of the associated rear frame interface arrangement IR. As a result, the torques which are generated by way of the chain traction forces FTC and therefore torsions of the drive unit DU, the frame interface unit IU or the bicycle frame 1 are reduced.

By way of the preferably single-piece arrangement of the frame interface arrangements IR, IF in the housing covers CH, weight and drive forces FPE are conducted onto the bottom bracket shaft SB, and chain traction forces FTC are conducted directly via the bearings BL, BR arranged in the housing covers CH into the housing covers CH, and from there via the frame interface arrangement IR, IF and the drive unit interface arrangements IDR, IDF into the frame interface unit IU and therefore into the bicycle frame.

The central housing tube TH (see FIG. 13) accordingly scarcely has to transmit load, and can be optimized with regard to other aspects, for example with regard to material selection and manufacturing options. On account of the preferably prismatic design of the housing tube TH, simple and inexpensive manufacturing options arise, for example by way of turning or extruding of an aluminium tube.

The housing tube TH can also be optimized with regard to maximum thermal conductivity with at the same time a low weight, by an aluminium alloy such as, for example, AL6060 preferably being selected for the housing tube TH, which aluminium alloy has a far better thermal conductivity than the magnesium which is frequently used in the prior art.

As an alternative, and not shown in the figures, the housing covers CH can also be arranged on the bicycle frame 1, in particular can be configured in one piece with the bicycle frame. One embodiment is likewise provided, in the case of which one of the housing covers, preferably the housing cover CHR which is arranged on the drive side, that is to say on the right-hand side in relation to the rider, is arranged on the bicycle frame and is preferably configured in one piece with the bicycle frame, while the other, left-hand-side housing covers CHL is configured as a separate component which can be disconnected from the housing tube TH. As a result, a simple access option to the drive housing HC which is configured in this way at least partially in one piece with the bicycle frame 1 is provided, for example for maintenance purposes.

In the following text, particularly preferred positions of the frame interface arrangements IR, IF or drive unit interface arrangements IDR, IDF relative to the drive unit DU or relative to the frame interface unit IU are shown in summary (cf. FIGS. 2 to 4 and FIGS. 7 to 11).

As is apparent from FIG. 3, in particular, all the frame interface arrangements IR, IF or drive unit interface arrangements IDR and IDF and therefore the two fixation axes FM1, FM2 preferably lie as interfaces between the drive unit DU in the bicycle frame 1 or between the drive unit DU and the frame interface unit IU in a vertical region above an imaginary horizontal plane PHB which contains the rotatory axis of the bottom bracket shaft SB, and below a horizontal plane PHC which contains the attack point PC of the chain traction force FTC.

Here, in order to minimize torques generated by way of the chain traction force FTC and corresponding loads or deformations of the drive unit DU, the frame interface unit IU or the bicycle frame 1, the vertical distance DPV between the rear fixation axis FM1 and the attack point PC of the chain traction force FTC is as small as possible, preferably smaller than 30 mm, particularly preferably smaller than 20 mm.

The two fixation axes FM1, FM2 likewise preferably lie further forwards than an imaginary vertical plane PVB which contains a rotatory axis of the bottom bracket shaft SB, preferably more than 20 mm further forwards than the imaginary vertical plane PVB.

The two fixation axes FM1, FM2 preferably lie in front of an imaginary inclined plane IP which contains the rotatory axis of the bottom bracket shaft SB, the inclined plane IP being tilted forwards by an angle $\beta$ of 50° relative to a horizontal plane, in other words being tilted in the clockwise direction, in relation to a view from the right as, for example, according to FIGS. 2 and 3.

In one particularly preferred combination of the three abovementioned embodiments, the two fixation axes FM1, FM2 lie in a vertical region between the two horizontal planes PHB and PHC, in front of the vertical plane PVB, and in front of the inclined plane IP.

The two fixation axes FM1, FM2 likewise preferably lie within an angle $\alpha$ of from 30° to 80°, localized in the top right bottom bracket quadrant QB1, particularly preferably within an angle $\alpha$ of from 50° to 60°, the vertex of the angle coinciding with the rotatory axis of the bottom bracket shaft SB (cf. FIGS. 3 and 4).

Furthermore, a combination of the abovementioned embodiments is particularly preferred, in the case of which the two fixation axes FM1, FM2 lie in a vertical region between the two horizontal planes PHB and PHC and in front of the vertical plane PVB, furthermore in front of the inclined plane IP, and within an angle $\alpha$ of from 30° to 80°, particularly preferably within an angle $\alpha$ of from 50° to 60°.

Numerous advantages over the prior art can be achieved by way of an arrangement of this type of the two fixation axes FM1, FM2 as interfaces between the drive unit DU and the bicycle frame 1 or between the drive unit DU and the frame interface unit IU.

First of all, substantially more installation space for assemblies of the rear suspension system 2, DS such as swing arm bearings MP and possibly a damper articulation is available as a result of designs of this type, since the bicycle frame 1 no longer has to reach, as in the prior art, comparatively far until behind the bottom bracket and in the process partially even as far as below the bottom bracket height. As a result, complexity, weight and costs are also decreased, and the frame manufacturer is given substantially more design freedom in the functionally highly important region directly behind the bottom bracket.

Furthermore, by way of the above-described designs, the possibilities for cooling the electric and electronic components of the drive unit are also improved over the prior art, in which the frame often encloses a large part of the drive unit, but at least in the region of the fixation axes. This plays an increasing role in the currently ever decreasing overall sizes of these components with at the same time generally increasing motor power outputs.

Figure 11:
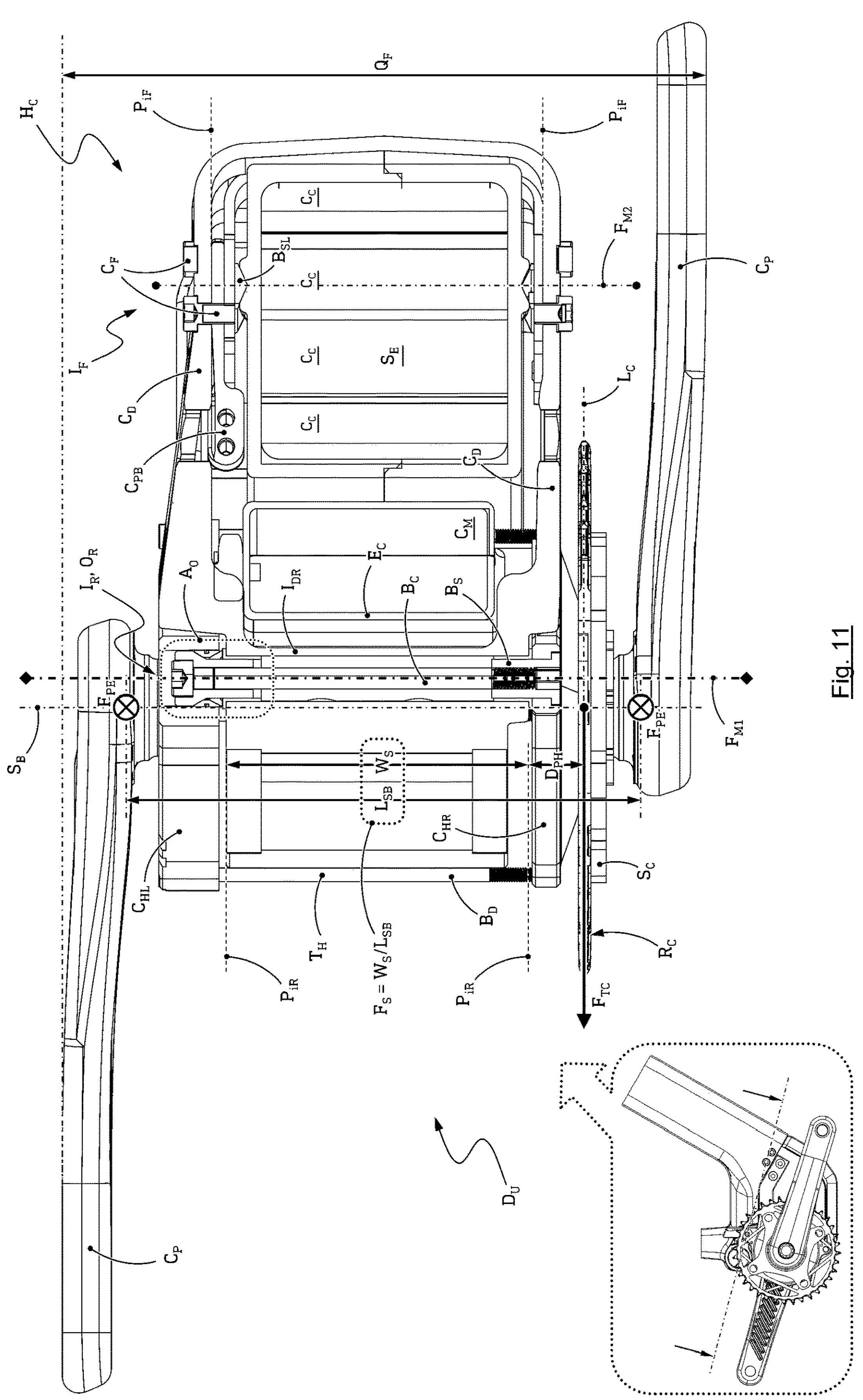
FIG. 11 shows the drive unit according to FIG. 2 in a longitudinal sectional illustration through the two frame interfaces, and the associated sectional course.

With regard to the lateral positioning of the frame interface arrangements, it is preferably provided that the interface planes PiR between the rear frame interface arrangements IR of the drive unit DU and the associated, rear drive unit interface arrangements IDR of the frame or the frame interface unit IU are positioned on the left and on the right in each case on the outboard side of the bicycle frame 1 with regard to optimum torque and force transmission from the drive unit DU to the bicycle frame 1, and with regard to high rigidity of the drive unit DU, which results in a correspondingly advantageously large support width WS (cf. FIGS. 7, 11 and 12).

In this context, a support factor FS can be formed (see FIG. 11) as quotient from the support width WS and the length LSB of the bottom bracket shaft (SB). The support factor FS is greater than 0.5, preferably greater than 0.55 and particularly preferably greater than 0.58.

As an alternative or in addition to the preferred values of the support factor FS, the support width WS is selected in such a way that a chain pull factor FPC (see FIG. 12) which is formed as quotient from the support width WS and a chain pull horizontal distance DPH between the attack point of the chain traction force FTC, i.e. the chain line LC, and the right-hand-side interface plane PiR is greater than 5, preferably greater than 5.2 and particularly preferably greater than 5.3.

In this way, an optimum transmission of the transverse forces which act on the drive unit DU, in particular the pedal forces FPE, and likewise the chain traction forces FTC on the shortest path into the bicycle frame is ensured. As a result, those structures of the drive unit DU and the bicycle frame 1 or the frame interface unit IU which are involved in this transmission of forces also obtain particularly high rigidity with a low weight as a result, which counteracts undesired torsions and associated power losses during operation of the drive unit DU.

In the case of drive units from the prior art, values for the support factor FS usually, in contrast, lie considerably below 0.4, and values for the chain pull factor FPC usually lie considerably below 3.

This results in high bending moments in the prior art as a result of the effect of the pedal forces FPE and the chain traction forces FTC, which bending moments lead either to correspondingly great deformations of the drive unit or the bicycle frame in the bottom bracket region, or have to be absorbed and compensated for by way of great wall thicknesses in these regions, which leads to correspondingly higher weights of the drive unit and the frame.

If the drive unit DU is of asymmetrical configuration in relation to a frame center plane PFC with regard to its essential dimensions in the transverse direction (along the axis of the bottom bracket shaft SB), as described further above in relation to FIG. 12, a chain pull factor FPC can be formed as quotient from a right-hand side support distance W'S (see FIG. 12) and the chain pull horizontal distance DPH as an alternative or in addition to a chain pull factor FPC which is formed as quotient from the support width WS and the chain pull horizontal distance DPH. In accordance with the present disclosure, this chain pull factor F'PC is greater than 2.5, preferably greater than 2.6 and particularly preferably greater than 2.65.

In particular in relation to the illustration of FIG. 7, a charging port (not shown in the figures) is also arranged on the housing EC of the controller device CMB in order to connect an external or internal (with regard to the drive unit DU) charging unit to the power supply. A further function of the housing EC of the controller device CMB can consist in connecting electric or electronic assemblies of the drive unit DU which are arranged in the region of different sides of the drive unit DU to one another, without any other power lines within the motor device ME, transversely through the motor device ME or any other self-supporting line connections outside the motor device ME being required to this end.

For example, a torque sensor device of the drive unit DU can be arranged in a right-hand-side region of the drive unit DU in the vicinity of the torque connection to the chainring RC, while at least parts of the motor controller CB, in particular parts of the electronic power system, can be arranged in a left-hand-side region of the drive unit in the vicinity of the electric motor. In cases of this type, the housing EC of the controller device CB affords the possibility, for example, of connecting the torque sensor unit to the electronic power system or to its actuation circuit through the housing EC, without it being necessary for lines to be laid either through the motor device ME or, in a largely unprotected manner, outside the motor device ME. The latter, in particular, is customary in the prior art.

It is also possible and provided for merely certain parts of the electronic power system for operating the electric motor, in particular the relatively voluminous capacitors of an electronic motor commutation means, to be arranged in the housing EC of the controller device CMB, while other parts of the electronic power system, in particular the power transistors, are arranged in the drive housing HC, for example on an inner side, in particular, of the left-hand-side housing cover CHL. The latter makes optimum cooling of the power transistors possible, in particular when the housing cover CHL is provided on the outer side with cooling fins (cf. FIGS. 4, 7, 10, 14 and 16).

Figure 5:
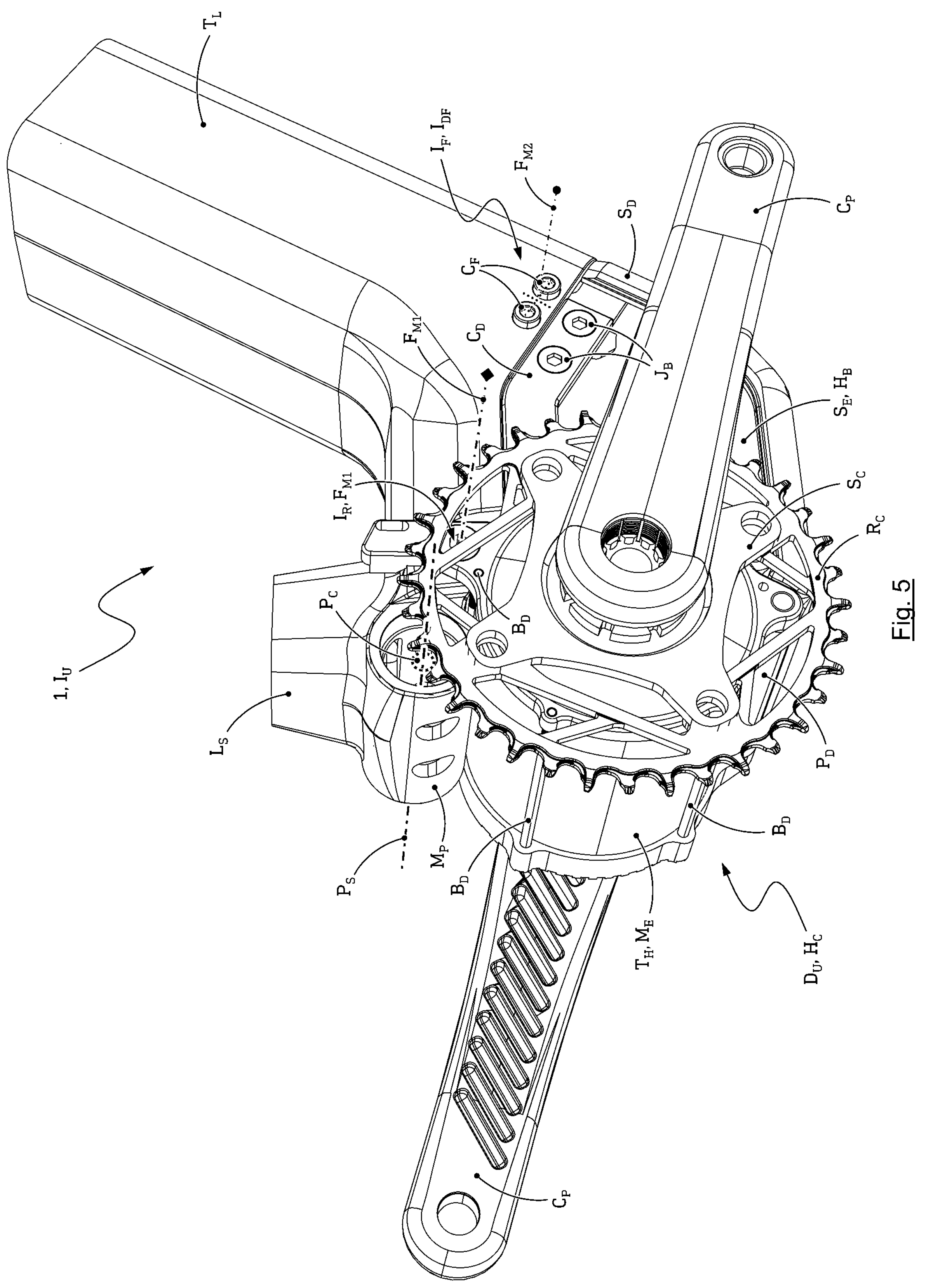
FIG. 5 shows the drive unit according to FIG. 2 in a rear inclined view from the drive side.
Figure 6:
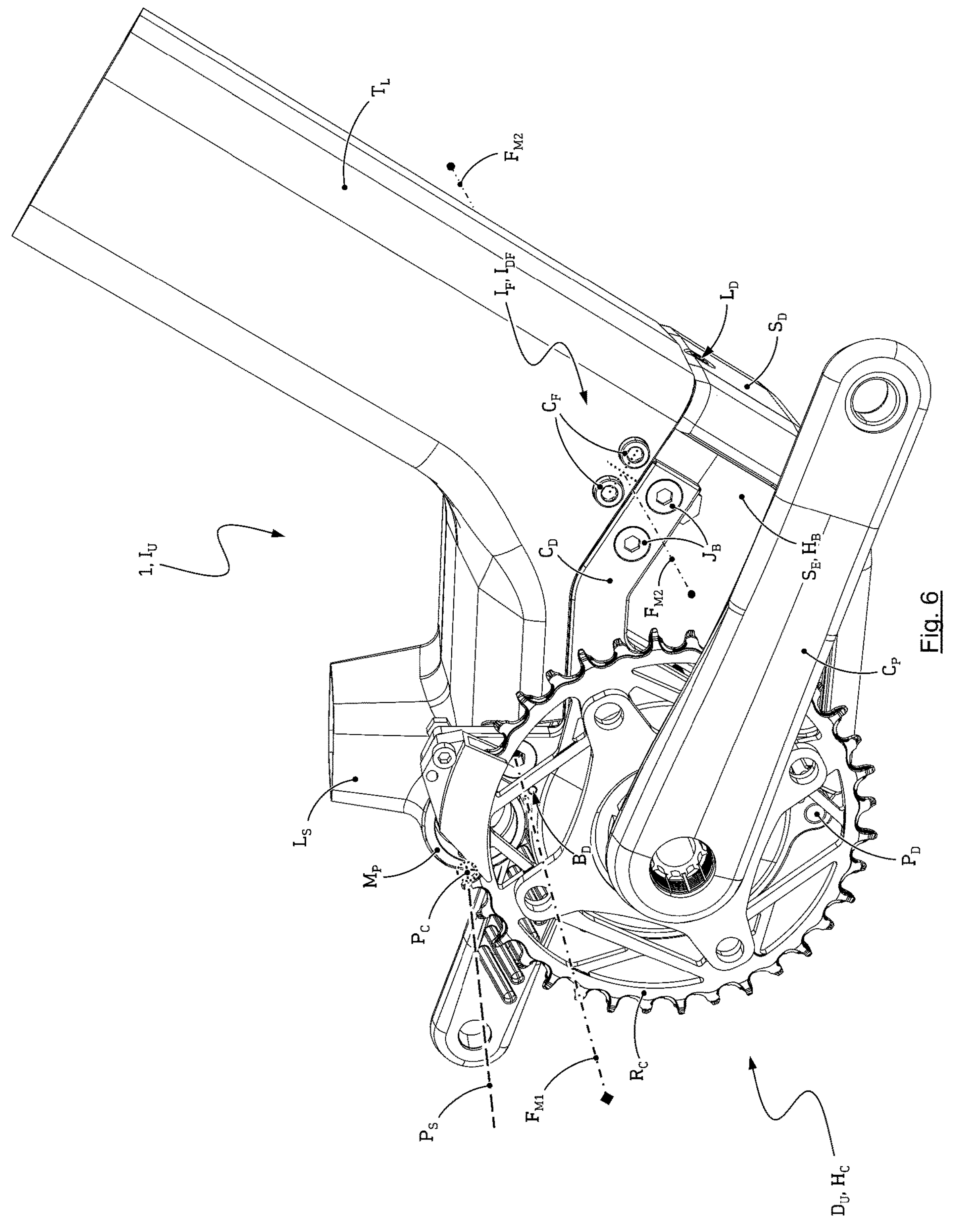
FIG. 6 shows the drive unit according to FIG. 2 in a front inclined view from the drive side.

An additional cooling option for the motor device ME can be provided by virtue of the fact that, in particular, the motor-side (that is to say, usually the left-hand) crank is provided with cooling fins (cf. FIGS. 5 and 8). Accordingly, heat can flow from the motor device ME through the bottom bracket shaft SB into the left-hand crank CP and can be dissipated there to the ambient air.

Figures 15A, 15B, 15C:
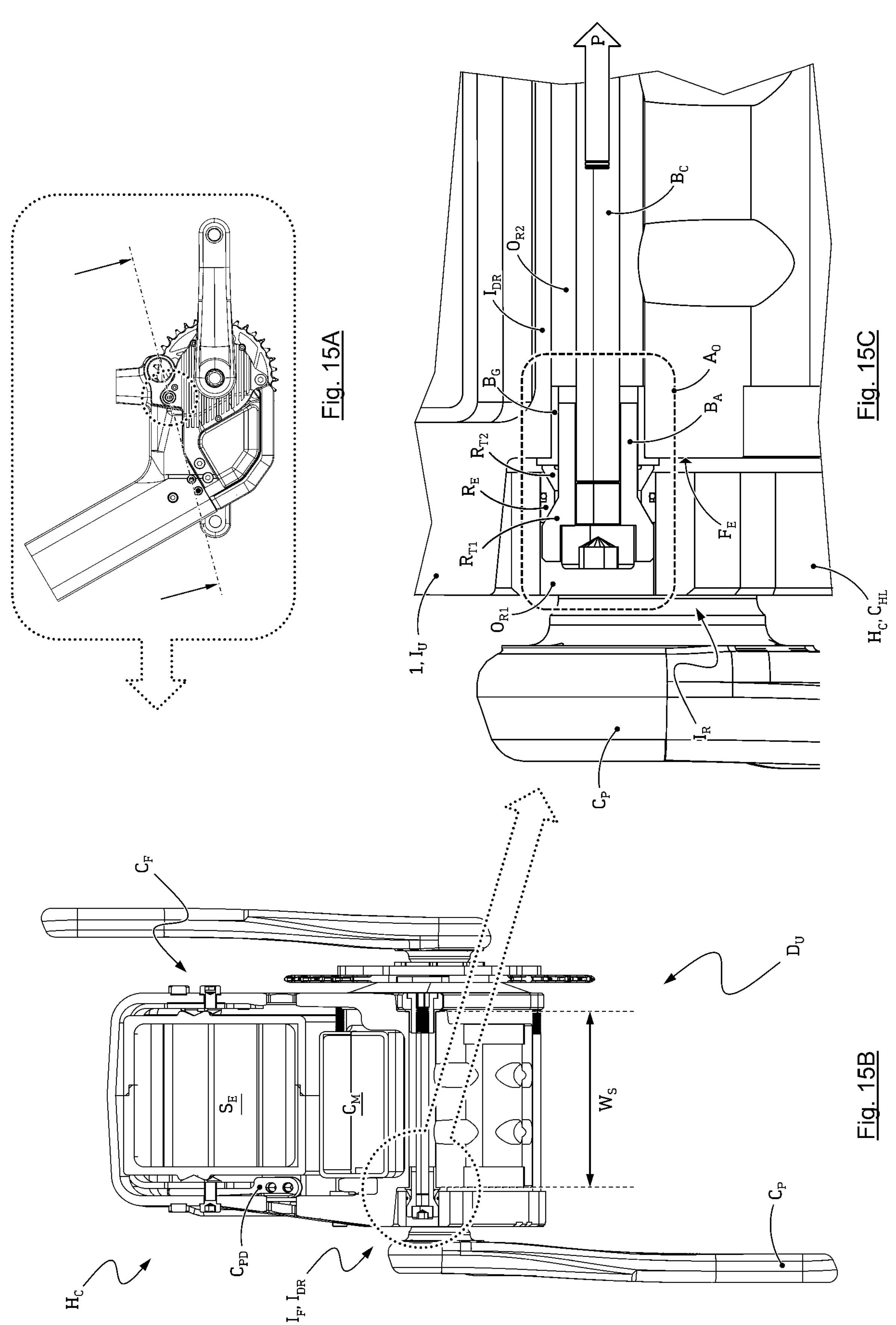
FIGS. 15A-15C show a frame offset adapter for compensating for different tolerances between the drive unit and the bicycle frame or between the drive unit and the frame interface unit according to FIG. 2.

FIG. 15C shows a longitudinal section through a left-hand rear frame interface arrangement IR and through the associated left-hand rear drive unit interface arrangement IDR of a bicycle frame 1 or a frame interface unit IU with a frame offset adapter AO arranged there for variable play-free setting of the clamping action in the axial direction between the frame interface arrangement IR and the drive unit interface arrangement IDR. Here, the sectional course of the longitudinal section which is shown in FIG. 15C can be derived from FIGS. 15A and 15B.

As is apparent from viewing FIG. 15C in combination with FIGS. 7 and 13, the offset adapter AO includes two thrust rings RT1, RT2 which taper in a wedge-shaped manner on the outer circumference, and expansion ring RE which is split into a plurality of segments along its circumferential direction, and an alignment bushing BA. In the case of the exemplary embodiment which is shown, the left-hand-side thrust ring RT1 is configured in one piece with the alignment bushing BA.

During the mounting of the drive unit DU on the bicycle frame 1 or on a frame interface unit IU, the connecting bolt BC is screwed into the screw bushing BS (see FIG. 7).

During tightening of the connecting bolt BC, the thrust rings RT1, RT2, the expansion ring RE and the alignment bushing BA are then pulled inwards in the receiving opening OR of the rear frame interface arrangement IR (to the right according to arrow direction P in relation to the drawing in FIG. 15C) until the inner, right-hand-side thrust ring RT2 comes into contact with the outer end face FE of the rear frame-side drive unit interface arrangement IDR or with the collar of a guide bushing BG which is arranged in between. The guide bushings BG can consist, in particular, of a vibration-damping high-performance plastic, and the transmission of motor noise to the bicycle frame 1 is reduced.

During further tightening of the connecting bolt BC, and axial compression of the offset adapter AO then takes place in such a way that the thrust rings RT1 and RT2 are pressed into the expansion ring RE in the axial direction, as a result of which the external diameter of the expansion ring RE is increased until the expansion ring RE is pressed fixedly into the receiving opening OR in a frictionally locking manner.

Therefore, a fixed connection which is play free both axially and radially (in relation to the connecting bolt BC) results automatically between the drive unit DU and the bicycle frame 1 or the frame interface unit IU merely by way of tightening of the connecting bolt BC.

This accelerates and facilitates the mounting of the drive unit DU, in particular under the aspect that it will be combined in the practice of the bicycle market with a very wide variety of bicycle frames 1 or with possibly different frame interface units IU, it being possible for the bicycle frame 1 or possibly the frame interface unit IU to come from or be supplied by a very wide variety of manufacturers.

As a result, a very wide variety of tolerant situations with regard to the support width WS of the rear drive unit interface arrangement IDR can result according to experience. Different tolerance situations of this type, depending on the origin of the bicycle frame or the frame interface unit IU, can therefore be handled and compensated for in a very simple way by the offset adapter AO.

An exact adaptation to any tolerances of the bicycle frame 1 or the frame interface unit IU and a fixed play-free connection between the drive unit DU and the bicycle frame 1 or the frame interface unit IU in all three spatial directions is not only of importance with regard to the secure and reliable transmission of the considerable drive and chain traction forces, as described further above in the case of FIG. 2 et seq., but rather also in order to avoid disturbing noise such as, for example, creaking or squeaking.

Since at least two or more fixation axes for connecting the drive unit and the bicycle frame are usually used in the prior art, in the case of which, unlike in the case of the present disclosure, however, no specific division of tasks is made among the different fixation axes with regard to the transmission of force, the transmission of torque and fixing of the degrees of freedom of movement of the drive unit relative to the bicycle frame, considerable difficulties frequently arise there with regard to the tolerance compensation during the mounting of the drive unit in the bicycle frame, and with regard to a durably fixed and play-free connection between the drive unit and the bicycle frame.

As has already been explained further above in detail in the description of FIG. 2 et seq., this problem is eliminated by way of the drive unit DU in accordance with the present disclosure, in particular by virtue of the fact that precisely two fixation axes are provided, of which the rear fixation axes is positioned very close to the essential force attack lines and assumes the task of fixing all the degrees of freedom of movement apart from a rotatory freedom of movement FR of the drive unit DU, and that the front fixation axis is configured merely and specifically as a torque cantilever for fixing the remaining rotatory degree of freedom FR of the drive unit DU.

FIG. 16 shows the drive unit DU according to FIGS. 2 to 15 once again in a perspective overall view as viewed from the rear left. It can be seen again that the drive unit DU represents a unit which can be handled in one piece, is enclosed by a common housing HC, and includes, in particular, the motor device ME and the energy storage device FC. The two fixation axes FM1 and FM2 for connecting to the bicycle frame 1 can also be seen clearly.

Instead of the battery SE which is shown in FIGS. 2 to 16, the drive unit DU can also be equipped in a modular manner with different battery sizes. In particular, the upper substantially prismatic part of the battery according to FIG. 16 which is provided for sliding into the lower tube TL of the bicycle frame 1 (cf. FIGS. 9 and 10) can be of longer or shorter configuration, in order in this way to provide batteries with a greater or smaller energy content. In particular, this region which is to be pushed into the lower tube TL can likewise be of narrower configuration, along the direction of travel of the bicycle, than in the case of the battery according to FIGS. 2 to 16 (for example, with merely two instead of three rows of battery cells), which results in a particularly narrow lateral silhouette of the bicycle frame.

One aspect of the present disclosure includes an electric bicycle drive unit (DU) for arrangement in a bottom bracket area (R) of a bicycle frame (1), the drive unit (DU) including: a bottom bracket assembly (AB) with a bottom bracket shaft (SB); an electric motor device (ME) with a motor shaft which is arranged coaxially or axially parallel with respect to the bottom bracket shaft; an energy storage device (SE) for supplying energy to the motor device (ME); wherein the energy storage device (SE), in a state of the drive unit (DU) installed in the bicycle frame (1) and ready for operation, can be arranged at least to a substantial extent in a down tube (TL) of the bicycle frame (1), the down tube having a closed tube cross section, and wherein the energy storage device (SE) is configured to be removable from the bicycle frame (1) in a removal direction extending coaxially with respect to a longitudinal axis of the down tube (TL), characterized in that, in the state of the drive unit (DU) in which it is installed into the bicycle frame (1) ready for operation, the energy storage device (SE) is fastened directly to a housing (HM) of the motor device (ME) or in a common housing (HC) of the motor device (ME) and the energy storage device (SE).

A further aspect of the present disclosure is characterized in that, in a state of the drive unit (DU) in which it is installed into the bicycle frame (1) ready for operation, the energy storage device (SE) is directly fastened exclusively to a housing (HM) of the motor device (ME) or in a common housing (HC) of the motor device (ME) and the energy storage device (SE).

A further aspect of the present disclosure is characterized in that the drive unit is configured for at least partial enclosure of the energy storage device by a housing of the motor device or by a common housing of the motor device and the energy storage device.

A further aspect of the present disclosure is characterized in that in a state of the drive unit (DU) in which it is installed into the bicycle frame (1) ready for operation, the drive unit (DU) and the energy storage device (SE) are configured for arranging the energy storage device (SE) to a substantial part outside a lower tube (TL) of the bicycle frame (1).

A further aspect of the present disclosure is characterized in that the energy storage device (SE) is situated at least partially below the rotatory axis of the bottom bracket shaft (SB) in a position which corresponds to the mounted state of the drive unit (DU) on the bicycle frame (1).

A further aspect of the present disclosure is characterized in that a mass centre of gravity (CGC) of the drive unit (DU) lies within the bottom bracket area (R).

A further aspect of the present disclosure is characterized in that the mass centre of gravity (CGC) of the drive unit (DU) is situated, in a bicycle side view and in a position of the drive unit (DU) which corresponds to the mounted state of the drive unit (DU) on the bicycle frame (1), within a circumcircle with the radius 175 mm (R1), preferably within a circumcircle with the radius 125 mm (R3), particularly preferably within a circumcircle with the radius 100 mm (R4) around the rotatory axis of the bottom bracket shaft (SB).

A further aspect of the present disclosure is characterized in that, in the state of the drive unit (DU) in which it is installed into the bicycle frame (1) ready for operation, the mass centre of gravity (CGC) of the drive unit (DU) is situated, in a side view from the right and in relation to the rotatory axis of the bottom bracket shaft (SB), within a bottom bracket quadrant (QB1) lying at the top right with the side length 175 mm (R1), preferably within a bottom bracket quadrant (QB3) with the side length 125 mm (R3), particularly preferably within a bottom bracket quadrant (QB4) with the side length 100 mm (R4).

A further aspect of the present disclosure is characterized in that the mass centre of gravity (CGC) of the drive unit (DU) is situated, in relation to the rotatory axis of the bottom bracket shaft (SB), at a height (HGC) of 50 mm, preferably of 30 mm, particularly preferably of 20 mm above the rotatory axis of the bottom bracket shaft (SB).

A further aspect of the present disclosure is characterized by a drive shield (SD) which is fastened exclusively to the housing (HM) of the motor device (ME) or to the common housing (HC) of the drive unit (DU), the drive shield (SD) at the same time forming a movable latch hatch for covering and/or securing the energy storage device (SE).

A further aspect of the present disclosure is characterized by precisely two frame interface arrangements (IR, IF) which define a rear fixation axis (FM1) and a front support axis arrangement with a front fixation axis (FM2).

A further aspect of the present disclosure is characterized in that, in the state of the drive unit (DU) in which it is installed into the bicycle frame (1) ready for operation, the rear fixation axis (FM1) is arranged in a vertical region above a horizontal plane (PHB) which contains a rotatory axis of the bottom bracket shaft (SB), and below a horizontal plane (PHC) which contains the attack point (PC) of the change traction force (FTC).

A further aspect of the present disclosure is characterized in that, in the state of the drive unit (DU) in which it is installed into the bicycle frame (1) ready for operation, the two fixation axes (FM1) and (FM2) are arranged in front of a vertical plane (PVB) which contains a rotatory axis of the bottom bracket shaft (SB).

A further aspect of the present disclosure is characterized in that the two fixation axes (FM1) and (FM2) are arranged in front of an inclined plane (IP) which contains the rotatory axis of the bottom bracket shaft (SB), the inclined plane (IP) being tilted forwards by an angle (β) of 50° relative to a horizontal plane.

A further aspect of the present disclosure is characterized in that the two fixation axes (FM1) and (FM2) are arranged within an angle (α) of from 30° to 80°, particularly preferably within an angle (α) of from 50° to 60°, localized in the right-hand upper bottom bracket quadrant (QB1), the vertex of the angle (α) coinciding with the rotatory axis of the bottom bracket shaft (SB).

A further aspect of the present disclosure is characterized in that a support width (WS), as a distance between a left-hand-side and a right-hand-side interface plane (PiR) of the rear frame interface arrangement (IR), is selected in such a way that a support factor (FS) which is formed as a quotient from the support width (WS) and the length (LSB) of the bottom bracket shaft (SB) is greater than 0.5, preferably greater than 0.55 and particularly preferably greater than 0.58.

A further aspect of the present disclosure is characterized in that a support width (WS), as distance between a left-hand-side and a right-hand-side interface plane (PiR) of the rear frame interface arrangement (IR), is selected in such a way that a chain pull factor (FPC) which is formed as a quotient from the support width (WS) and a chain pull horizontal distance (DPH) is greater than 5, preferably greater than 5.2 and particularly preferably greater than 5.3.

A further aspect of the present disclosure is characterized in that the drive unit (DU) is configured to fix all the degrees of freedom of movement of the drive unit (DU) with respect to the bicycle frame (1) or with respect to a frame interface unit (IU) via the rear frame interface arrangement (IR), apart from a rotary freedom of movement (FR) about a rotatory axis (FM1) which is parallel to the rotatory axis of the bottom bracket shaft (SB).

A further aspect of the present disclosure is characterized in that the drive unit (DU) is configured to fix all the rotary freedom of movement (FR) with respect to the bicycle frame (1) or with respect to a frame interface unit (IU) by way of the front frame interface arrangement (IF) by means of a frictional connection (CF, WF).

A further aspect of the present disclosure is characterized in that the rear frame interface arrangement (IR) has a frame offset adapter (AO) for compensating for width tolerances of the bicycle frame (1) and/or the frame interface unit (IU), the frame of said adapter (AO) including a radial clamping device (RE, RT1, RT2) which can be received in an axially displaceable manner in a receiving opening (OR) of the drive housing (HC) for radial fixing (with regard to the rear fixation axis (FM1) of the rear frame interface arrangement (IR) relative to the bicycle frame (1) or relative to the frame interface unit (IU) and for axial tolerance compensation, which can be adjusted in an infinitely variable manner without play, between the rear frame interface arrangement (IR) and the bicycle frame (1) or the frame interface unit (IU).

A further aspect of the present disclosure is characterized by a hermetically closed controller housing (EC) which is arranged in a spatial region between the motor device (ME) and the energy storage device (SE) for receiving a controller device (CMB) for controlling the motor device (ME) and/or the energy storage device (SE).

A further aspect of the present disclosure is characterized by a current interface (IC) which is arranged on the controller housing (EC) or is connected to the controller housing (EC) for connecting the control device (CMB) to the energy storage device (SE) with interface surfaces (Pi) which are arranged parallel to a removal direction (DR) of the energy storage device (SE), in such a way that the current interface is opened by way of removal of the energy storage device (SE) from the drive unit (DU) and is connected by way of insertion of the energy storage device (SE) into the drive unit (DU).

A further aspect of the present disclosure is characterized in that the housing (HM) of the motor device (ME) or the common housing (HC) of the motor device (ME) and the energy storage device (SE) has pivot mounts (MP) for a swing arm (AS) of a suspended rear frame (2).

An aspect of the present disclosure includes a bicycle frame (1) or frame interface unit (IU), having a rear drive unit interface arrangement (IDR) and a front drive unit interface arrangement (IDF) for connecting to a drive unit (DU) characterized by precisely two drive unit interface arrangements (IDR, IDF) which define a rear fixation axis (FM1) and a front support axle arrangement with a front fixation axis (FM2), it being possible for all of the degrees of freedom of movement of the drive unit (DU) with respect to the bicycle frame (1) or the frame interface unit (IU) to be fixed via the rear drive unit interface arrangement (IDR), apart from a rotary freedom of movement (FR) about the rear fixation axis (FM1), and the front drive unit interface arrangement (IDF) being configured as a torque support for fixing the rotary freedom of movement (FR) of the drive unit.

A further aspect of the present disclosure is characterized by an arrangement of two fixation axes (FM1) and (FM2) analogous to the arrangement of the two fixation axes (FM1) and (FM2) with the drive unit (DU).

A further aspect of the present disclosure is characterized by a support factor (FS) and/or a chain pull factor (FPC).

An aspect of the present disclosures includes an energy storage device (SE) for a drive unit (DU) characterized by features of one of the above aspects that relate to the energy storage device device (SE).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term “invention” merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electric bicycle drive unit for arrangement in a bottom bracket area of a bicycle frame, the drive unit comprising:

a bottom bracket assembly with a bottom bracket shaft, an electric motor device with a motor shaft which is arranged coaxially or axially parallel with respect to the bottom bracket shaft, an energy storage device for supplying energy to the motor device, wherein the energy storage device, in a state of the drive unit installed in the bicycle frame and ready for operation, can be arranged at least to a substantial extent in a down tube of the bicycle frame, the down tube having a closed tube cross section, and wherein the energy storage device is configured to be removable from the bicycle frame in a removal direction extending coaxially with respect to a longitudinal axis of the down, tube;

wherein two frame interface arrangements define a rear fixation axis and a front support axis arrangement with a front fixation axis; and wherein, in the state of the drive unit in which it is installed into the bicycle frame ready for operation, the two fixation axes are arranged in front of a vertical plane which contains a rotatory axis of the bottom bracket shaft.

2. The electric bicycle drive unit according to claim 1, wherein in a state of the drive unit in which it is installed into the bicycle frame ready for operation, the energy storage device is directly fastened exclusively to a housing of the motor device or in a common housing of the motor device and the energy storage device.

3. The electric bicycle drive unit according to claim 1, wherein the drive unit is configured for at least partial enclosure of the energy storage device by a housing of the motor device or by a common housing of the motor device and the energy storage device.

4. The electric bicycle drive unit according to claim 1, wherein in a state of the drive unit in which it is installed into the bicycle frame ready for operation, the drive unit and the energy storage device are configured for arranging the energy storage device to a substantial part outside a lower tube of the bicycle frame.

5. The electric bicycle drive unit according to claim 1, wherein the energy storage device is situated at least partially below the rotatory axis of the bottom bracket shaft in a position which corresponds to the mounted state of the drive unit on the bicycle frame.

6. The electric bicycle drive unit according to claim 1, wherein a mass center of gravity of the drive unit lies within the bottom bracket area.

7. The electric bicycle drive unit according to claim 6, wherein the mass center of gravity of the drive unit is situated, in a bicycle side view and in a position of the drive unit which corresponds to the mounted state of the drive unit on the bicycle frame, within a circumcircle with the radius 175 mm around the rotatory axis of the bottom bracket shaft.

8. The electric bicycle drive unit according to claim 7, wherein in the state of the drive unit in which it is installed into the bicycle frame ready for operation, the mass center of gravity of the drive unit is situated, in a side view from the right and in relation to the rotatory axis of the bottom bracket shaft, within a bottom bracket quadrant lying at the top right with the side length 175 mm.

9. The electric bicycle drive unit according to claim 8, wherein the mass center of gravity of the drive unit is situated, in relation to the rotatory axis of the bottom bracket shaft, at a height of 50 mm above the rotatory axis of the bottom bracket shaft.

10. The electric bicycle drive unit according to claim 1, further comprising:

a drive shield fastened exclusively to the housing of the motor device or to the common housing of the drive unit, the drive shield at the same time forming a movable latch hatch for covering and/or securing the energy storage device.

11. The electric bicycle drive unit according to claim 1, wherein in the state of the drive unit in which it is installed into the bicycle frame ready for operation, the rear fixation axis is arranged in a vertical region above a horizontal plane which contains the rotatory axis of the bottom bracket shaft, and below a horizontal plane which contains an attack point of a chain traction force.

12. The electric bicycle drive unit according to claim 1, wherein the two fixation axes are arranged in front of an inclined plane which contains the rotatory axis of the bottom bracket shaft, the inclined plane being tilted forwards by an angle of 50° relative to a horizontal plane.

13. The electric bicycle drive unit according to claim 1, wherein the two fixation axes are arranged within an angle of 30° to 80° localized in a right-hand upper bottom bracket quadrant, a vertex of the angle coinciding with the rotatory axis of the bottom bracket shaft.

14. The electric bicycle drive unit according to claim 1, wherein a support width, as a distance between a left-hand-side and a right-hand-side interface plane of a rear frame interface arrangement, is selected in such a way that a support factor which is formed as a quotient from the support width and the length of the bottom bracket shaft is greater than 0.5.

15. The electric bicycle drive unit according to claim 1, wherein a support width, as distance between a left-hand-side and a right-hand-side interface plane of a rear frame interface arrangement, is selected in such a way that a chain pull factor which is formed as a quotient from the support width and a chain pull horizontal distance is greater than 5.

16. The electric bicycle drive unit according to claim 1, wherein the drive unit is configured to fix all degrees of freedom of movement of the drive unit with respect to the bicycle frame or with respect to a frame interface unit via a rear frame interface arrangement, apart from a rotary freedom of movement about a rotatory axis which is parallel to the rotatory axis of the bottom bracket shaft.

17. The electric bicycle drive unit according to claim 16, wherein the drive unit is configured to fix all the rotary freedom of movement with respect to the bicycle frame or with respect to a frame interface unit by way of a front frame interface arrangement by a frictional connection.

18. The electric bicycle drive unit according to claim 17, wherein the rear frame interface arrangement has a frame offset adapter for compensating for width tolerances of the bicycle frame and/or the frame interface unit, the frame of said adapter comprising a radial clamping device which can be received in an axially displaceable manner in a receiving opening of the drive housing for radial fixing with regard to the rear fixation axis of the rear frame interface arrangement relative to the bicycle frame or relative to the frame interface unit and for axial tolerance compensation, which can be adjusted in an infinitely variable manner without play, between the rear frame interface arrangement and the bicycle frame or the frame interface unit.

* * * * *